(12) United States Patent
Koppelman et al.

(10) Patent No.: US 10,556,670 B2
(45) Date of Patent: Feb. 11, 2020

(54) LAMINAR FLOW PANEL

(71) Applicant: The Boeing Company, Chicago, IL (US)

(72) Inventors: Henry J. Koppelman, Seattle, WA (US); Michael K. Klein, Bothell, WA (US)

(73) Assignee: The Boeing Company, Chicago, IL (US)

( * ) Notice: Subject to any disclaimer, the term of this patent is extended or adjusted under 35 U.S.C. 154(b) by 561 days.

(21) Appl. No.: 15/043,152

(22) Filed: Feb. 12, 2016

(65) Prior Publication Data
US 2016/0159465 A1    Jun. 9, 2016

Related U.S. Application Data

(63) Continuation-in-part of application No. 14/307,160, filed on Jun. 17, 2014, now Pat. No. 10,370,090, which is a continuation of application No. 12/856,667, filed on Aug. 15, 2010, now Pat. No. 8,783,624.

(51) Int. Cl.
*B64C 21/06* (2006.01)
*B64C 3/26* (2006.01)

(52) U.S. Cl.
CPC .............. *B64C 21/06* (2013.01); *B64C 3/26* (2013.01); *B64C 2230/22* (2013.01); *Y02T 50/166* (2013.01)

(58) Field of Classification Search
CPC .......... B64C 2230/00; B64C 2230/04; B64C 2230/16; B64C 2230/20; B64C 2230/22; B64C 21/00–08

USPC ........................................................ 244/209
See application file for complete search history.

(56) References Cited

U.S. PATENT DOCUMENTS 2,297,540 A * 9/1942 Driscoll ................ B64D 15/12
                                                      244/134 D
2,643,832 A    6/1953 Thwaites
2,742,247 A    4/1956 Lachmann
(Continued)

FOREIGN PATENT DOCUMENTS

EP    2418147 A2    2/2012

OTHER PUBLICATIONS

Nicola Contuzzi, Sabina L. Campanelli, Caterina Casavola and Luciano Lamberti, "Manufacturing and Characterization of 18Ni Marage 300 Lattice Components by Selective Laser Melting," Jul. 18, 2013, (Year: 2013).*

(Continued)

*Primary Examiner* — Marc Burgess
(74) *Attorney, Agent, or Firm* — Miller, Matthias & Hull LLP

(57) ABSTRACT

An aerodynamic body operable to both promote laminar flow and satisfy structural requirements is disclosed. A perforated panel skin comprises an inner surface and an outer surface of the aerodynamic body. A micro-lattice support structure is coupled to the inner surface and defines airflow gaps allowing suctioning of air from the outer surface through the perforated panel skin and into a plenum of the aerodynamic body. Rows of main beams of the micro-lattice support structure are aligned along land lines oriented in a substantially chord-wise direction relative to an airflow over the aerodynamic body.

15 Claims, 13 Drawing Sheets

(56) References Cited

U.S. PATENT DOCUMENTS

| | | | |
|---|---|---|---|
| 3,097,817 A | | 7/1963 | Towzey, Jr. |
| 4,993,663 A | | 2/1991 | Lahti et al. |
| 5,167,387 A | | 12/1992 | Hartwich |
| 5,263,667 A | * | 11/1993 | Horstman ............... B64C 21/06 244/130 |
| 5,316,032 A | | 5/1994 | DeCoux |
| 5,366,177 A | | 11/1994 | DeCoux |
| 5,542,630 A | | 8/1996 | Savill |
| 5,590,854 A | | 1/1997 | Shatz |
| 6,050,523 A | | 4/2000 | Kraenzien |
| 6,119,978 A | * | 9/2000 | Kobayashi ........... B21D 26/055 244/134 R |
| 6,216,982 B1 | | 4/2001 | Pfennig et al. |
| 7,152,829 B2 | | 12/2006 | Bertolotti |
| 8,459,597 B2 | | 6/2013 | Cloft et al. |
| 8,586,179 B1 | * | 11/2013 | Jacobsen ................... B32B 7/08 428/315.5 |
| 8,800,915 B2 | * | 8/2014 | Gerber ...................... B64C 5/06 244/123.1 |
| 9,321,241 B2 | * | 4/2016 | Doty ......................... B32B 3/12 |
| 9,453,604 B1 | * | 9/2016 | Maloney ................. F16L 41/00 |
| 9,511,848 B2 | * | 12/2016 | Gerber ...................... B64C 3/26 |
| 10,183,740 B2 | * | 1/2019 | Gerber ................... B64C 21/06 |
| 2003/0173460 A1 | | 9/2003 | Chapman, Jr. |
| 2009/0212165 A1 | | 8/2009 | Parikh |
| 2010/0116943 A1 | | 5/2010 | Meister |
| 2010/0291466 A1 | * | 11/2010 | Rock ................... H01M 4/8875 429/483 |
| 2010/0294893 A1 | | 11/2010 | Heintze et al. |
| 2011/0006165 A1 | | 1/2011 | Ireland |
| 2011/0168843 A1 | | 7/2011 | Calder |
| 2011/0168852 A1 | | 7/2011 | Porte et al. |
| 2011/0198444 A1 | | 8/2011 | Dong |
| 2012/0037760 A1 | | 2/2012 | Koppelman et al. |
| 2012/0043428 A1 | | 2/2012 | Goelling et al. |
| 2012/0085867 A1 | | 4/2012 | Bardwell |
| 2013/0175402 A1 | | 7/2013 | Voege |
| 2013/0273347 A1 | * | 10/2013 | Jacobsen ................... B32B 3/26 428/304.4 |

OTHER PUBLICATIONS

K Ushijima, WJ Cantwell, RAW Mines, S Tsopanos and M Smith, "An investigation into the compressive properties of stainless steel micro-lattice structures," 2010, Journal of Sandwich Structures and Materials (Year: 2010).*

Search Report for related European Application No. EP17153230.2; report dated Jun. 28, 2017.

High Reynolds number HLFC Flight Experiment on B-757, vol. III—Leading Edge Design, Fabrication and Installation. Boeing Commercial Airplane Group, Report D6-55648-3, Nov. 1992.

F-16XL-2 SLFC Flight Experiment: NASA TP-1999-209683, S. G. Anders and M. C. Fischer, Dec. 1999.

Boeing Commercial Airplane Group; "High Reynolds Number HLFC Flight Experiment III. Leading Edge Design, Fabrication and Installation"; NASA/CR-1999-209325, Apr. 1999; pp. 9-17, 49 and 51-52.

S. G. Anders and M. C. Fischer, "F-16XL-2 Supersonic Laminar Flow Control Flight Test Experiment"; NASA TP-1999-209683; Dec. 1999, pp. 12-13 and 163-168.

Schaedler, et al; "Designing Metallic Microlattices for Energy Absorber Applications"; Advanced Engineering Materials; 2014; No. 3.

T. A. Schaedler, et al.; "Ultralight Metallic Microlattices" Science 334, 962 (2011); DOI: 10.1126/ science.1211649; ISSN 0036-8075; online ISSN 1095-9203.

Examination Report from the GCC Patent Office for related Application No. GC2017-32917; report dated Dec. 20, 2018.

Nicola Contuzzi*, Sabina L. Campanelli, Caterina Casavola and Lucianolamberti; Manufacturing and Characterization of 18Ni Marage 300 Lattice Components by Selective Laser Melting; Open Access Materials; Materials 2013, 6, 3451-3468; doi:10.3390/ma6083451.

* cited by examiner

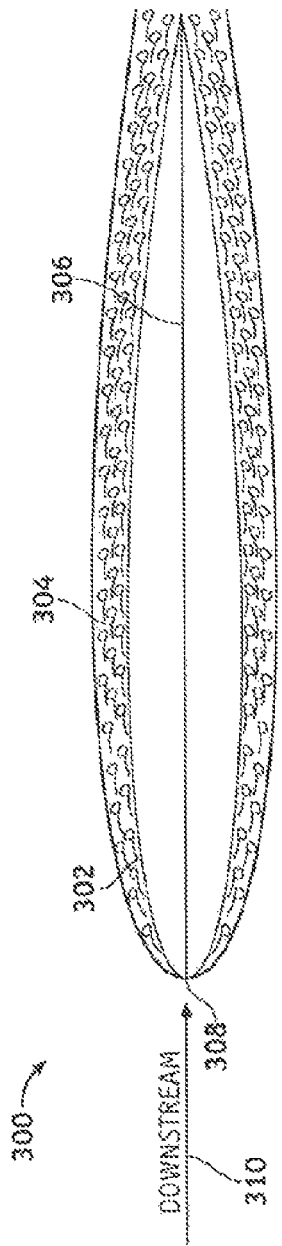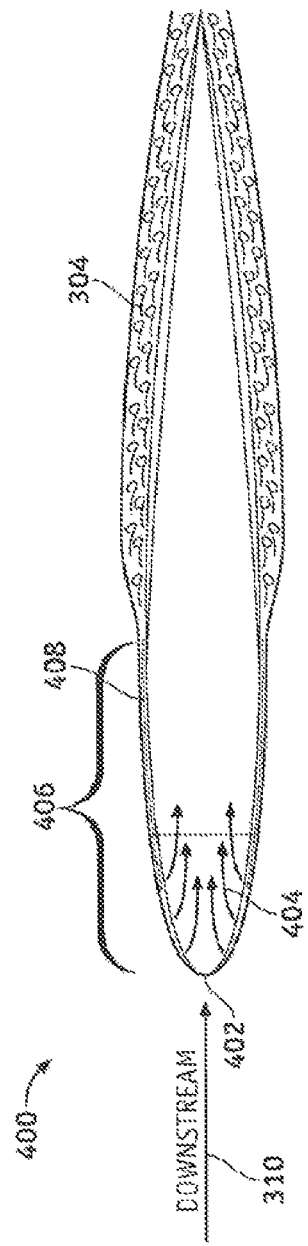

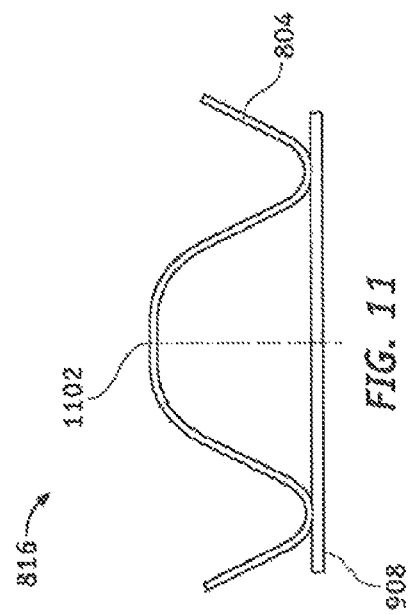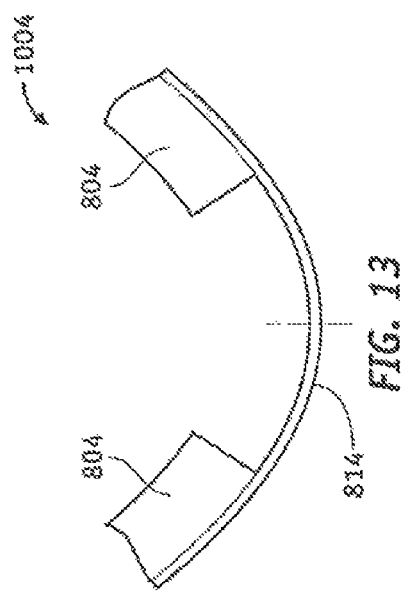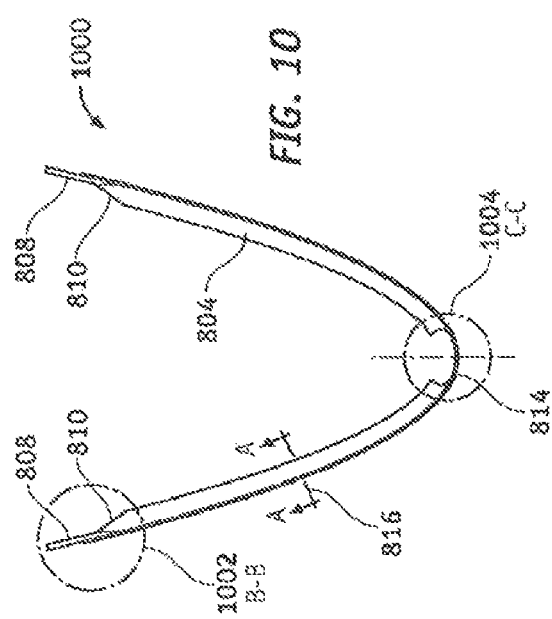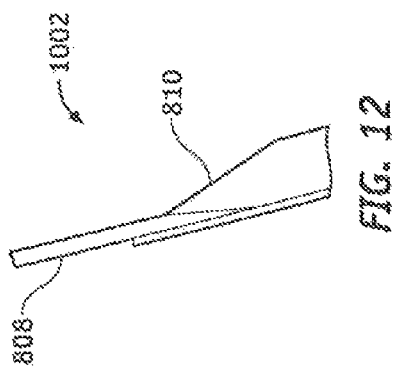

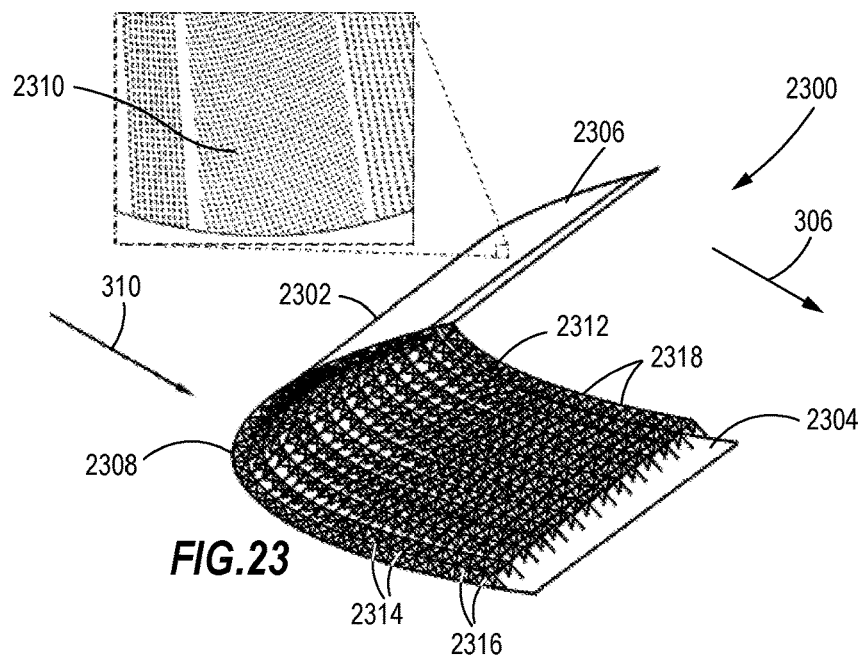
FIG.23
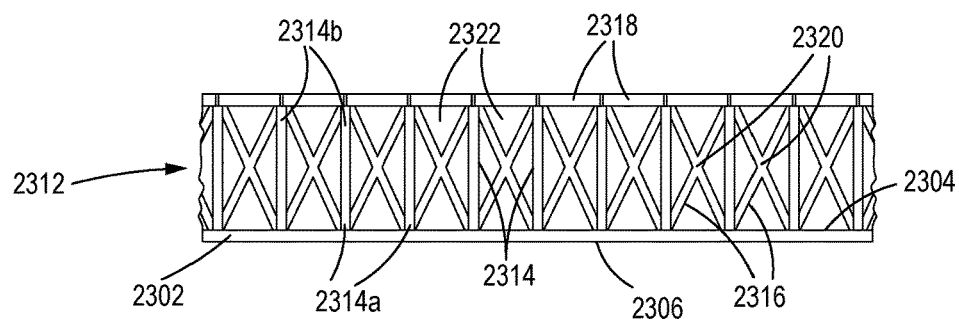
FIG.24
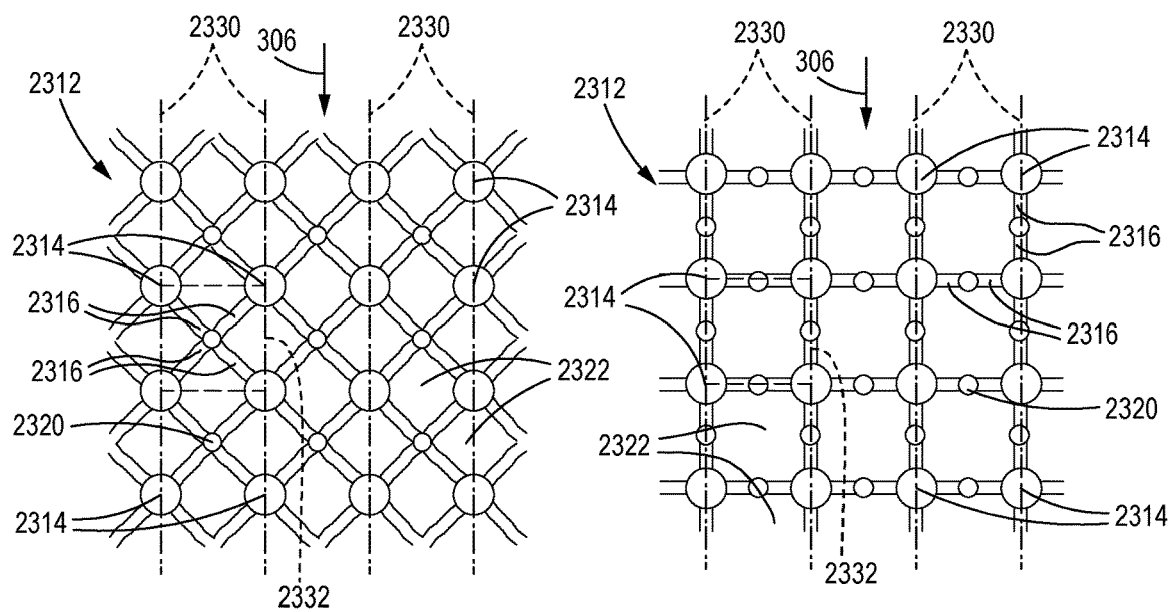
FIG.25
FIG.26

LAMINAR FLOW PANEL

CROSS-REFERENCE TO RELATED APPLICATION

This application is a continuation-in-part of U.S. patent application Ser. No. 14/307,160, filed Jun. 17, 2014, which is a continuation of U.S. patent application Ser. No. 12/856,667, filed Aug. 15, 2010. The patent applications identified above are incorporated here by reference in their entirety to provide continuity of disclosure.

FIELD

Embodiments of the present disclosure relate generally to aerodynamic surfaces. More particularly, embodiments of the present disclosure relate to aerodynamic surfaces providing laminar flow.

BACKGROUND

Laminar flow comprises, for example but without limitation, a smooth low turbulence flow of air over a contour of parts of an aircraft such as wings, fuselage, and the like. The term laminar flow is derived from a process where layers of air are formed one next to the other in formation of a boundary layer. Interruption of a smooth flow of boundary layer air over a wing section can create turbulence, which may result in non-optimal lift and/or non-optimal drag. An aerodynamic body designed for minimum drag and uninterrupted flow of the boundary layer may be called a laminar aerodynamic surface. A laminar aerodynamic surface may maintain an adhesion of boundary layers of airflow as far aft of a leading edge as practical. On non-laminar aerodynamic bodies, a boundary layer may be interrupted at high speeds and result in turbulent flow over a remainder of the non-laminar aerodynamic surface. This turbulent flow may be realized as drag, which may be non-optimal.

SUMMARY

An aerodynamic body operable to both promote laminar flow and satisfy structural requirements is disclosed. A perforated panel skin comprises an inner surface and an outer surface. The outer surface comprises a leading edge of the aerodynamic body. The inner surface is stiffened by a micro-lattice stiffener structure coupled thereon. The micro-lattice stiffener structure may extend along the inner surface of the aerodynamic body downstream of perforations in the panel skin to provide structural support for the panel skin while allowing airflow through the perforations to an interior surface of the aerodynamic structure to promote laminar flow on the outer surface of the panel skin.

In one aspect of the present disclosure, an aerodynamic body defining a chord-wise direction relative to an airflow over the aerodynamic body is disclosed. The aerodynamic body may include an outer panel skin having an inner surface, an outer surface, and a plurality of perforations extending from the inner surface to the outer surface, the outer panel skin extending around an interior surface of the aerodynamic body and defining a leading edge of the aerodynamic body, and a micro-lattice stiffener structure. The micro-lattice stiffener structure may include a plurality of main beams each having at least a first end connected to the inner surface of the outer panel skin, and a plurality of diagonal support struts each extending diagonally between and connected to adjacent main beams. The micro-lattice stiffener structure may extend along the inner surface of the outer panel skin downstream of the plurality of perforations, and the plurality of main beams and the plurality of diagonal support struts may define airflow gaps there between to place the plurality of perforations in fluid communication with the interior surface of the aerodynamic body downstream from the micro-lattice stiffener structure.

In another aspect of the present disclosure, a method of generating a laminar flow from an airflow passing over an exterior of an aerodynamic body is disclosed. The aerodynamic body may define a chord-wise direction relative to the airflow. The method may include communicating a portion of the airflow through perforations formed in an outer panel skin of the aerodynamic body that may extend around an interior surface of the aerodynamic body, directing the portion of the airflow from the perforations through a micro-lattice stiffener structure that defines airflow gaps there through and extending substantially in the chord-wise direction from a leading edge of the aerodynamic body, and receiving the airflow into the interior surface of the aerodynamic body through the airflow gaps of the micro-lattice stiffener structure.

In a further aspect of the present disclosure, an aerodynamic body defining a chord-wise direction relative to an airflow over the aerodynamic body is disclosed. The aerodynamic body may include an outer panel skin having an inner surface, an outer surface, and a plurality of perforations extending from the inner surface to the outer surface, the outer panel skin extending around an interior surface of the aerodynamic body and defining a leading edge of the aerodynamic body, and a micro-lattice stiffener structure. The micro-lattice stiffener structure may include a plurality of main beams each having at least a first end connected to the inner surface of the outer panel skin, and a plurality of diagonal support struts each extending diagonally between and connected to adjacent main beams. The micro-lattice stiffener structure may extend along the inner surface of the outer panel skin downstream of the plurality of perforations, and the plurality of main beams and the plurality of diagonal support struts may define airflow gaps there between to place the plurality of perforations in fluid communication with the interior surface of the aerodynamic body downstream from the micro-lattice stiffener structure. The aerodynamic body may further include an inner panel skin disposed within the aerodynamic body proximate the leading edge and extending rearward with the inner panel skin may be connected to corresponding ones of the plurality of main beams at second ends that are opposite the first ends of the corresponding ones of the plurality of main beams. The outer panel skin and the inner panel skin may define an airflow channel there between placing the plurality of perforations in fluid communication with the interior surface of the aerodynamic body downstream from the inner panel skin.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 3 is an illustration of a vertical fin cross section without a laminar flow corrugation-stiffened bonded structure for providing Hybrid Laminar Flow Control.

FIG. 4 is an illustration of a vertical fin cross section comprising a laminar flow corrugation-stiffened bonded structure providing Hybrid Laminar Flow Control according to an embodiment of the disclosure.

FIG. 10 is an illustration of a cross section of an exemplary laminar flow corrugation-stiffened bonded structure according to an embodiment of the disclosure.

FIG. 11 is an illustration of a section A-A of the exemplary laminar flow corrugation-stiffened bonded structure shown in FIG. 10 according to an embodiment of the disclosure.

FIG. 12 is an illustration of a section B-B of the exemplary laminar flow corrugation-stiffened bonded structure shown in FIG. 10 according to an embodiment of the disclosure.

FIG. 13 is an illustration of a section C-C of the exemplary laminar flow corrugation-stiffened bonded structure shown in FIG. 10 according to an embodiment of the disclosure.

FIG. 23 is an illustration of a perspective view of an exemplary laminar flow micro-lattice-stiffened structure according to an embodiment of the disclosure.

FIG. 24 is a partial end view of the micro-lattice-stiffened structure of FIG. 23.

FIG. 25 is a top view of a portion of an embodiment of a micro-lattice stiffener structure in accordance with the present disclosure for the micro-lattice-stiffened structure of FIGS. 23 and 24.

FIG. 26 is a top view of a portion of an alternative embodiment of the micro-lattice stiffener structure in accordance with the present disclosure for the micro-lattice-stiffened structure of FIGS. 23 and 24.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, structures, manufacturing, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of practical non-limiting applications, namely, an airfoil leading edge. Embodiments of the disclosure, however, are not limited to such airfoil leading edge applications, and the techniques described herein may also be utilized in other aerodynamic surface applications. For example, embodiments may be applicable to tail structures, engine struts, wind turbine blades, hydrodynamic surfaces utilizing liquid (e.g., water) instead of air, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
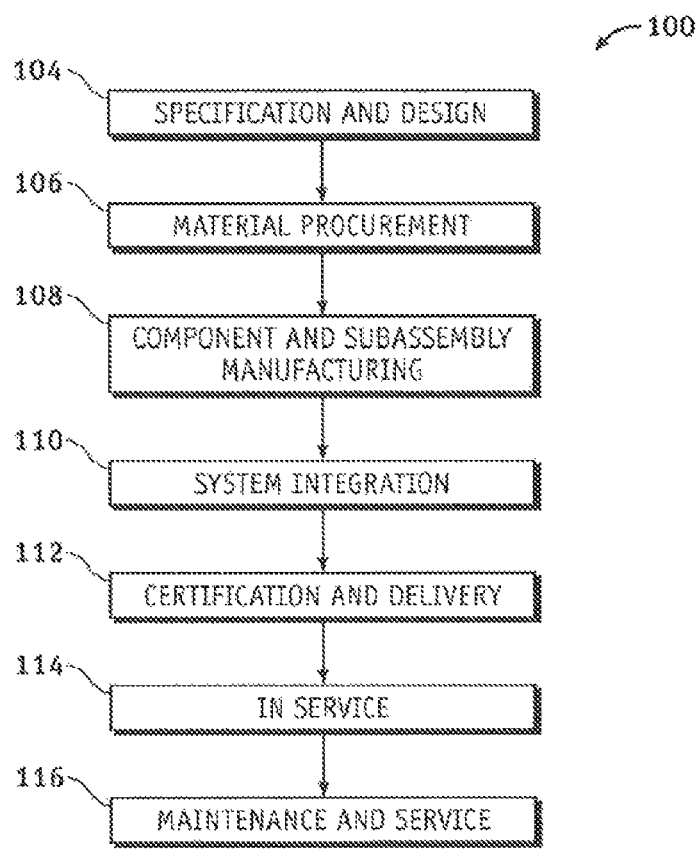
FIG. 1 is an illustration of a flow diagram of an exemplary aircraft production and service methodology.
Figure 2:
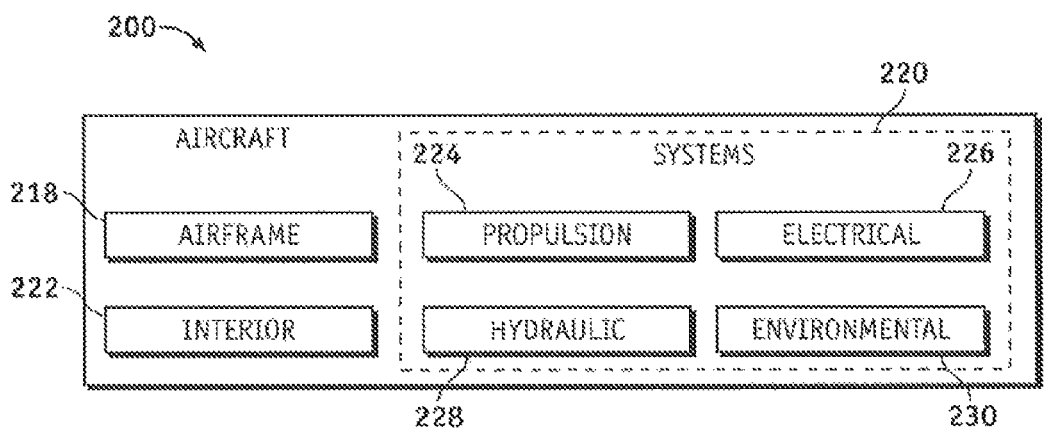
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Embodiments of the disclosure provide for enabling and maintaining laminar flow over airplane external surfaces utilizing a Hybrid Laminar Flow Control, thereby reducing skin friction drag. Hybrid Laminar Flow Control may refer to a strategic application of suction through small holes in a leading-edge region of a surface such as a wing to remove instabilities that may cause airflow near a surface to transition from a laminar to a turbulent state.

FIG. 3 is an illustration of a vertical fin cross section 300 without Hybrid Laminar Flow Control showing turbulent flow 304 near a surface 302. As shown in FIG. 3, the turbulent flow 304 near the surface 302 is fully turbulent, thereby creating a high skin friction drag.

FIG. 4 is an illustration of a vertical fin cross section 400 (airfoil 400) comprising a laminar flow corrugation-stiffened bonded structure 402 (corrugation-stiffened structure 402) providing Hybrid Laminar Flow Control according to an embodiment of the disclosure. A suction area 404 of the corrugation-stiffened structure 402 creates a laminar flow 406 near an airfoil surface 408. The suction area 404 is perforated to allow air to flow through the airfoil surface 408, and stiffened to maintain shape while allowing the airflow to occur. Embodiments of the corrugation-stiffened structure 402 are described below in the context of FIGS. 8-20.

Figure 5:
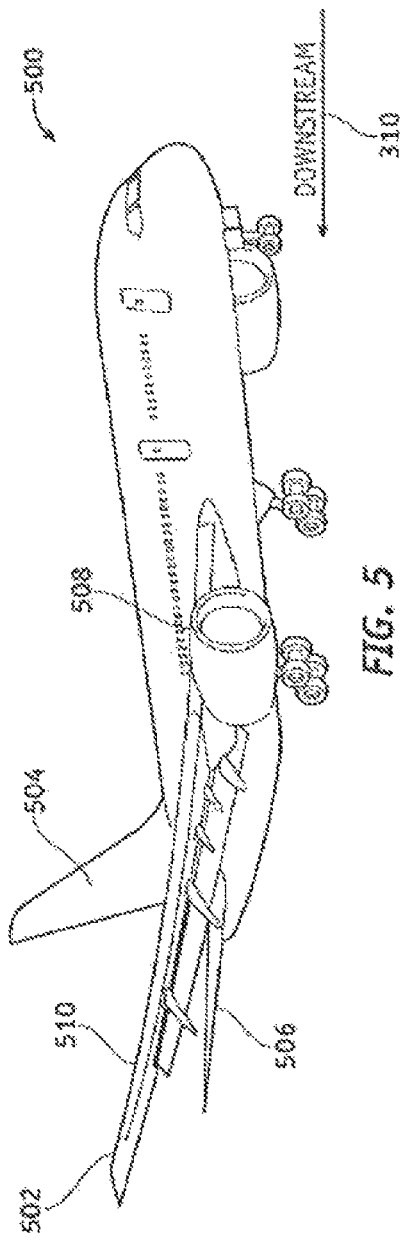
FIG. 5 is an illustration of an aircraft showing various external structures that can be subject to laminar flow.
Figure 7:
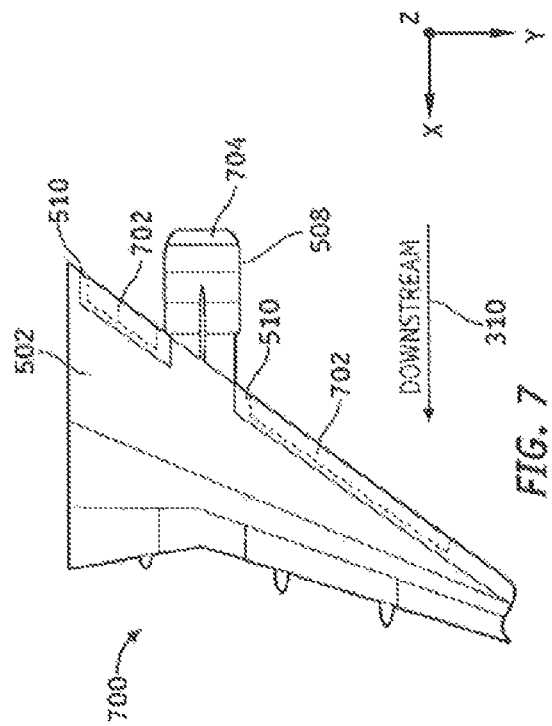
FIG. 7 is an illustration of a wing of the aircraft shown in FIG. 5 showing approximate regions of laminar flow on leading edge control surfaces and on an engine nacelle.
Figure 6:
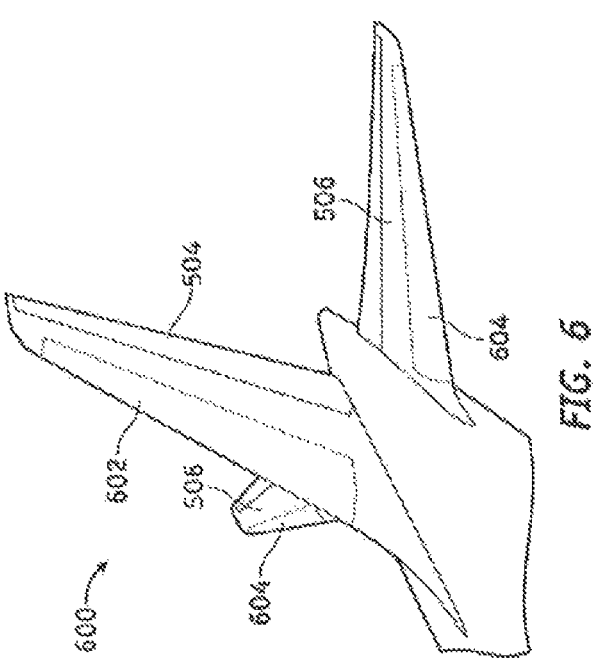
FIG. 6 is an illustration of a tail section of the aircraft shown in FIG. 5 showing approximate regions of laminar flow on a vertical fin and horizontal stabilizers.

Embodiments of the disclosure provide a panel structure that enables laminar flow over at least a portion of external surfaces such as the external surfaces of an aircraft 500 (FIG. 5) and maintains a laminar boundary layer on exterior aerodynamic surfaces as shown in FIGS. 5-7.

FIG. 5 is an illustration of the aircraft 500 showing various external structures, such as but without limitation, the vertical fin 504, a horizontal stabilizer 506, an engine nacelle 508, leading edge control surfaces 510 (i.e., flap and spoilers), and the like, that can be subject to laminar flow.

FIG. 6 is an illustration of a tail section 600 of the aircraft 500 showing approximate regions of laminar flow 602 and 604 on the vertical fin 504 and the horizontal stabilizers 506 respectively.

FIG. 7 is an illustration of a wing 502 of the aircraft 500 showing approximate regions of laminar flow 702 and 704 on the leading edge control surfaces 510 and on the engine nacelle 508 respectively.

Figure 8:
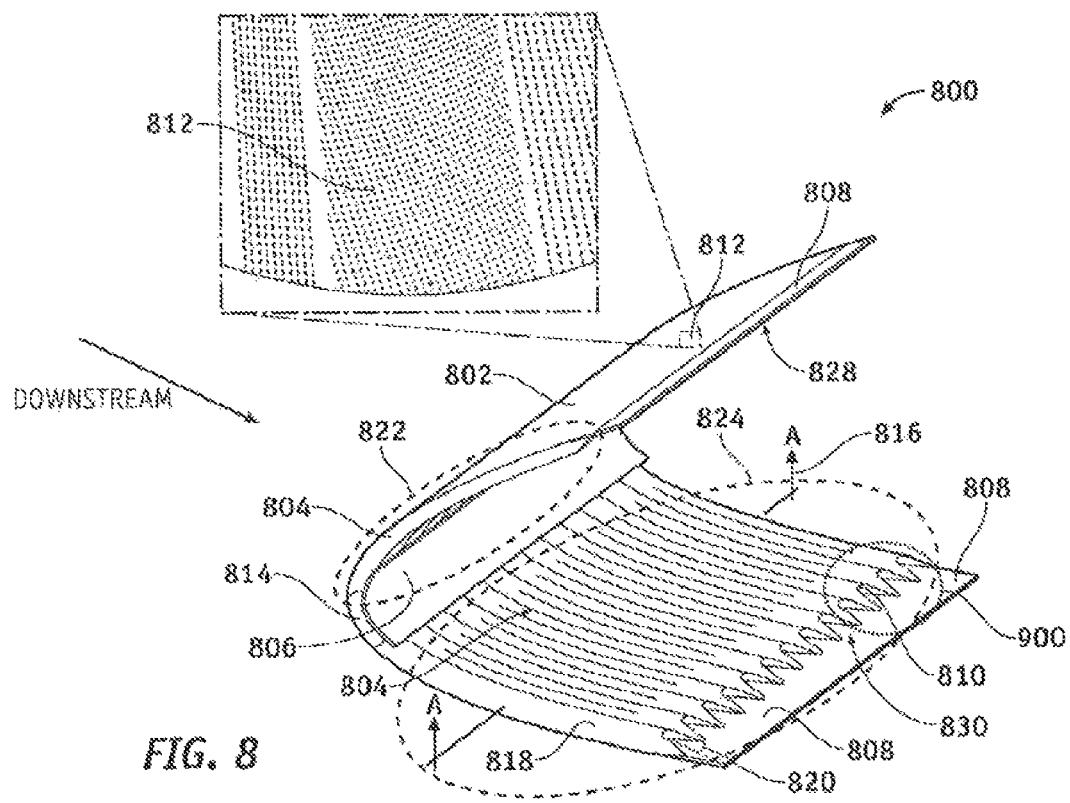
FIG. 8 is an illustration of a perspective view of an exemplary laminar flow corrugation-stiffened bonded structure according to an embodiment of the disclosure.

FIG. 8 is an illustration of a perspective view of an exemplary laminar flow corrugation-stiffened bonded structure 800 (corrugation-stiffened structure 800) according to an embodiment of the disclosure. The corrugation-stiffened structure 800 may be an aerodynamic body comprising, for example but without limitation, a flat panel, a curved leading edge, and the like. The corrugation-stiffened structure 800 comprises a perforated panel skin 802, one or more corrugated stiffeners 804, a strap 806, an edgeband 808, and one or more ends 810 of the corrugated stiffeners 804.

The perforated panel skin 802 allows for passively suctioning air 902 (FIG. 9) from an outer surface 908 (FIG. 9) to an inner surface 910 (FIG. 9) of the corrugation-stiffened structure 800 via a plurality of perforations/holes 812 to facilitate laminar flow over external aerodynamic surfaces such as, but without limitation, the vertical fin 504, the horizontal stabilizer 506, the engine nacelle 508, the leading edge control surfaces 510, and the like (FIGS. 5-7). The perforated panel skin 802 may be made of, for example but without limitation, carbon fiber-reinforced polymer (CFRP)/CP2 titanium, and the like. A thickness 1508 (FIG. 15) of the perforated panel skin 802 may be, for example but without limitation, about 0.04 inches to about 0.063 inches, and the like.

The perforations/holes 812 are, for example but without limitation, suitably spaced, shaped, drilled (e.g., laser-drilled), and the like to allow an appropriate amount of passive-suction of air from the outside surface 908 to the inner surface 910 while maintaining laminar flow surfaces sufficiently smooth. In this manner, the perforated panel skin 802 is suitably perforated to allow air to flow therethrough, and is stiffened, as explained in more detail below, to maintain its shape while allowing the airflow to occur. A number of the perforations/holes 812 used may depend on, for example but without limitation, flight speed, local Mach number, structural integrity, aerodynamic requirements, and the like. For example but without limitation, in a subsonic flight, a suitable number of the perforations/holes 812 can be provided to drop a surface pressure of the external aerodynamic surfaces by about one psi for passively moving the air 902 from the outer/external surface 908 to the inner surface 910. In this manner, laminar flow over the external aerodynamic surfaces is facilitated.

The corrugated stiffeners 804 are formed to stiffen the panel/corrugation-stiffened structure 800. The corrugated stiffeners 804 comprise corrugated or wave-shaped composite stiffeners which are bonded (FIG. 15) to the inner surface 910 (FIG. 9) of the corrugation-stiffened structure 800. For example, adhesively bonding the corrugated stiffeners 804 to the inner surface 910 precludes a need for traditional fasteners. Fasteners may disrupt the airflow over the external aerodynamic surfaces, reducing or negating laminar flow benefits. In the embodiment shown in FIG. 8, the corrugated stiffeners 804 are located on an upper inner surface 828 and a lower inner surface 830 of the inner surface 910 of the corrugation-stiffened structure 800. In the embodiment shown in FIG. 8, one or more hollow members 818 coupled to each of the upper inner surface 828 and the lower inner surface 830 stiffen the leading edge 308/814. In the embodiment shown in FIG. 8, the corrugated stiffeners 804 are formed in two pieces. An upper piece 822 and a lower piece 824 are detached from the leading edge 308/814 to facilitate manufacturing of the corrugated stiffeners 804. In this manner, the upper piece 822 and the lower piece 824 of the corrugated stiffeners 804 are not extended through the leading edge 308/814, and are coupled to each other by the strap 806 as explained below.

However, in another embodiment, the corrugated stiffeners 804 are extended to the leading edge 308/814 (1902 FIG. 19), thereby the strap 806 is not used. In this manner, a suitable composite material is utilized, as explained below, to allow fabrication of the corrugated stiffeners 804 around the leading edge 308/814 as one continuous piece.

In one embodiment, the corrugated stiffeners 804 are oriented in a substantially chord-wise direction 306 (FIG. 3) of the leading edge 308/814, relative to a downstream airflow 310 over the airfoil 400, and substantially perpendicular to the leading edge 308/814. Chord-wise orientation of the corrugated stiffeners 804 is more efficient structurally, spanning between a stiff nose of the leading edge 308/814 and an auxiliary spar (not shown). However, various shapes may be used for the corrugated stiffeners 804 depending on, for example but without limitation, various pressure zones on the external aerodynamic surfaces (FIGS. 5-7). The corrugated stiffeners 804 may be, for example but without limitation, hexagonal, V-shape, and the like. In order to meet aerodynamic porosity requirements while still maintaining structural integrity at substantially all loads and environmental conditions, bonded joints 1502 (FIG. 15) can be configured to block a substantially minimum number of the perforations/holes 812 on the perforated panel skin 802. In this manner, airflow passes through the perforated panel skin 802 and around the corrugated stiffeners 804 to a low-pressure passive aft-facing vent as explained below in more detail in the context of discussion of FIG. 9.

The corrugated stiffeners 804 may be made from, for example but without limitation, CP-2 titanium, one ply of 0/+−60 BMS9-223 braided carbon fiber-reinforced polymer, or the like. An orientation of a braid may be such that about 50% of the carbon fibers are in the substantially chord-wise direction 306 for structural efficiency. This may also be easier to fabricate, as 60-degree fibers may bend around sharp corners better than 90-degree fibers. The corrugated stiffeners 804 can provide the leading edge 308/814 with adequate bending stiffness, smoothness, and waviness to meet operational requirements. In addition, the corrugated stiffeners 804 enable good bonding to the perforated panel skin 802. The good bonding can mitigate current methods where parts may be held substantially rigid during assembly by vacuum-chuck bond assembly tools and bonding between two rigid bodies may be non-optimized due to achievable part tolerances. The corrugated stiffeners 804 and corrugation-stiffened structure 800 are as lightweight as possible in order to meet overall airplane efficiency demands.

As mentioned above, in one embodiment, the corrugated stiffeners 804 are formed in one-piece (1902 in FIG. 19) continuously on the inner surface 910 providing full stiffeners extended to and around the leading edge 308/814. In this manner, the corrugated stiffeners 804 are substantially lightweight and may utilize a formable structure such as, for example but without limitation, a carbon fiber-reinforced polymer utilizing "broken carbon fiber", Stretch-Broken Carbon Fiber, and the like. However, as mentioned above, the corrugated stiffeners 804 may be alternatively formed from two or more pieces. Thus, a carbon fiber-reinforced polymer braid that may not be formed into a tight "nose" radius may be formed in two or more pieces as explained above. An exemplary geometric shape of the corrugated stiffeners 804 is shown in more detail in FIG. 11 below.

Figure 16:
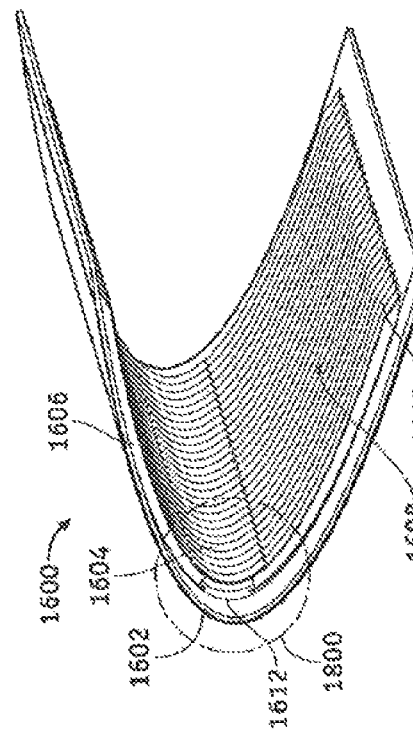
FIG. 16 is an illustration of a perspective view of a portion of an exemplary laminar flow corrugation-stiffened bonded showing a corrugated leading edge strap according to an embodiment of the disclosure.

The strap 806 couples the upper piece 822 and the lower piece 824 of the corrugated stiffeners 804 to each other. The strap 806 conforms to the corrugated stiffeners 804 at ridges 1102 (FIG. 11) but still allows airflow. In the embodiment shown in FIG. 8, the strap 806 does not touch the perforated panel skin 802. The strap 806 may be made from, for example but without limitation, CP1 titanium, and the like, having a thickness of, for example but without limitation, about 0.03 inches to about 0.06 inches, and the like. The strap 806 is bonded in an area near the leading edge 814 to provide stiffness and strength to the corrugation-stiffened structure 800. The strap 806 may comprise, for example but without limitation, a smooth surface as shown in FIG. 8, a corrugated surface such as a corrugated leading edge strap 1604 as shown in FIG. 16, and the like. The corrugated leading edge strap 1604 provides continuity between the upper piece 822 and the lower piece 824 of the corrugated stiffeners 804 so that the upper piece 822 and the lower piece 824 communicate air.

The edgeband 808 is coupled to the perforated panel skin 802 and the corrugated stiffeners 804. The edgeband 808 couples the corrugation-stiffened structure 800 to a substructure (not shown) and acts as a plenum chamber to receive air from the corrugated stiffeners 804. The edgeband 808 may be made from, for example but without limitation, fiberglass, aramid fiber, carbon fiber, aluminum, and the like.

The ends 810 (outlets 810) of the corrugated stiffeners 804 allow air to exit therethrough. The ends 810 provide an outlet for the hollow members 818 to flow air 902 (FIG. 9) to the edgeband 808/plenum chamber. The ends 810 may be shaped, for example but without limitation, triangular, circular, rectangular, and the like. Angles 820 of the ends 810 are provided such that stress concentration at the ends 810 is prevented.

Current honeycomb sandwich leading edge architectures may not be amenable to incorporation of the hybrid laminar flow. Current honeycomb sandwich panels also: 1) tend to absorb and retain moisture; 2) may be non-optimal for inspection; and 3) may be less optimal for repair than the corrugation-stiffened structure 800.

Figure 9:
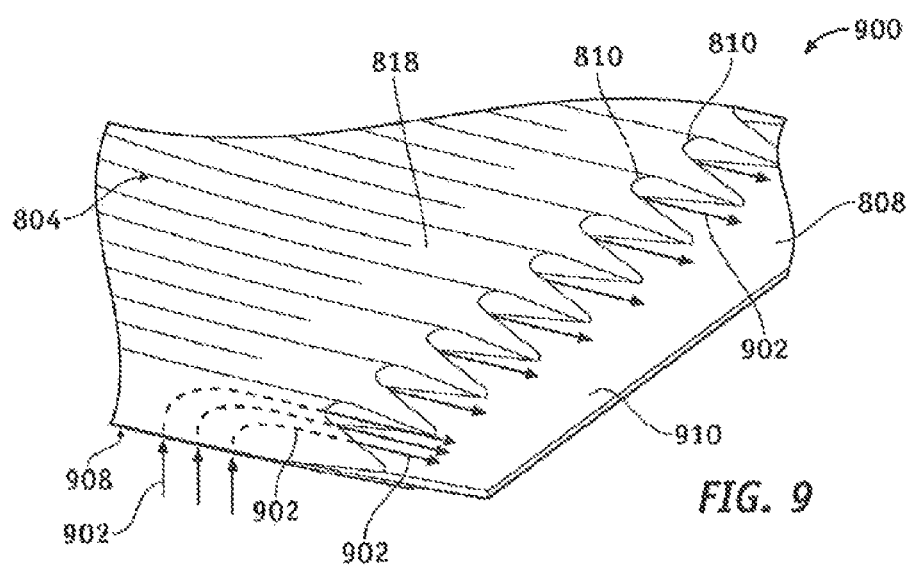
FIG. 9 is an illustration of an enlarged view of a section of the exemplary laminar flow corrugation-stiffened bonded structure shown in FIG. 8 showing airflow according to an embodiment of the disclosure.

FIG. 9 is an illustration of an enlarged view of a section 900 of the corrugation-stiffened structure 800 showing an airflow according to an embodiment of the disclosure. The air 902 flows through the perforated panel skin 802, continues to flow along the hollow members 818 of the corrugated stiffeners 804, and exits from the ends 810 (outlets 810) of the corrugated stiffeners 804. In this manner, the corrugation-stiffened structure 800 provides for a low-pressure passive aft-facing vent to allow a sufficient amount of air suction for maintaining a laminar boundary layer on the perforated panel skin 802, while providing a stiff skin such as the perforated panel skin 802.

FIGS. 10-13 illustrate exemplary geometric shapes of the corrugation-stiffened structure 800. FIGS. 10-13 may have functions, material, and structures that are similar to the embodiments shown in FIGS. 1-12. Therefore, common features, functions, and elements may not be redundantly described here.

FIG. 10 is an illustration of a cross section 1000 of the exemplary corrugation-stiffened structure 800 showing the corrugated stiffeners 804, the edgeband 808, and the ends 810 according to an embodiment of the disclosure.

FIG. 11 is an illustration of a section A-A 816 of the corrugated stiffeners 804 of the corrugation-stiffened structure 800 shown in FIG. 10 showing a wave-like shape comprising ridges 1102 of the corrugated stiffeners 804 according to an embodiment of the disclosure.

FIG. 12 is an illustration of an enlarged view of a section B-B 1002 of the exemplary corrugation-stiffened structure 800 shown in FIG. 10 showing the edgeband 808 and the ends 810, according to an embodiment of the disclosure.

FIG. 13 is an illustration of an enlarged view of a section C-C 1004 of the exemplary corrugation-stiffened structure 800 shown in FIG. 10 showing the corrugated stiffeners 804 and the leading edge 814 according to an embodiment of the disclosure.

Figure 14:
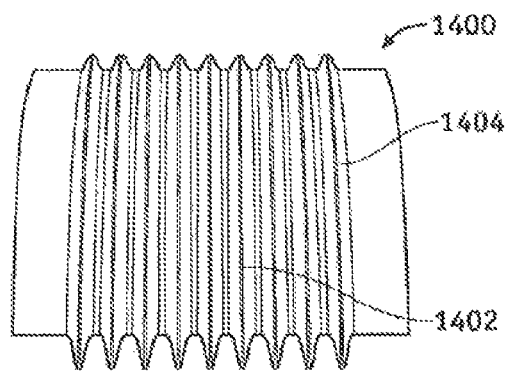
FIG. 14 is an illustration of a top view of an exemplary stiffener of a laminar flow corrugation-stiffened bonded structure showing adhesive placed on each rib stiffener according to an embodiment of the disclosure.

FIG. 14 is an illustration of a top view 1400 of an exemplary rib stiffener 1404 of the corrugation-stiffened structure 800 showing an adhesive 1402 placed on the rib stiffener 1404 according to an embodiment of the disclosure. In this manner, each of the rib stiffener 1404 receives the adhesive 1402 at each of the bonded joints 1502 (stiffener node) shown in FIG. 15.

Figure 15:
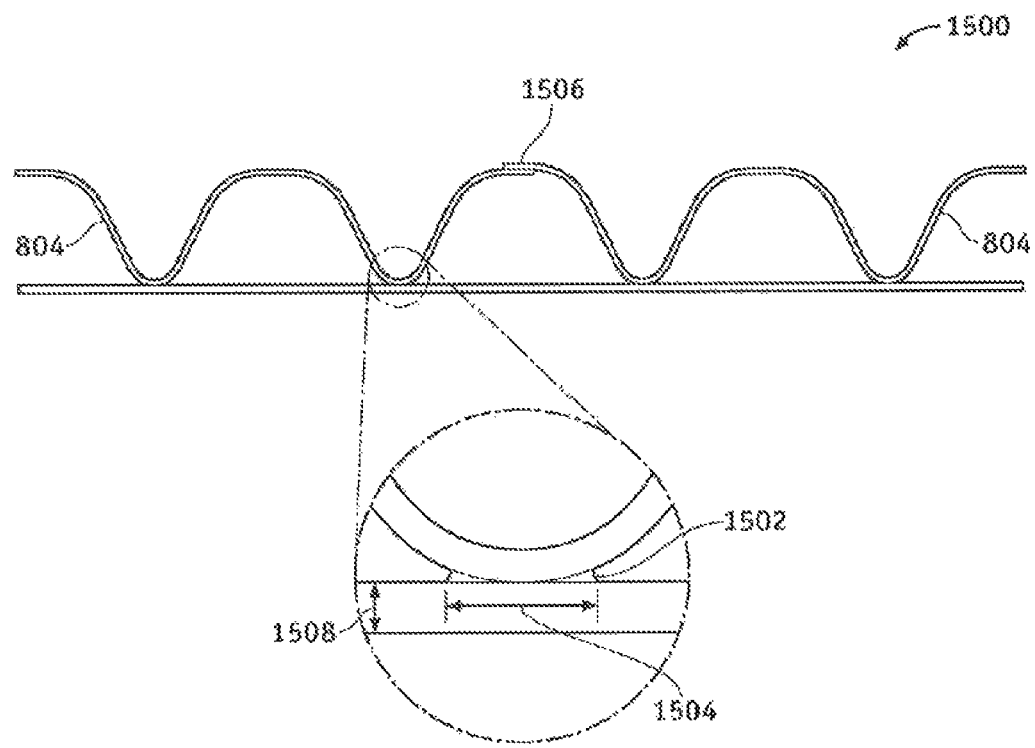
FIG. 15 is an illustration of a cross sectional view of an exemplary stiffener of a laminar flow corrugation-stiffened bonded structure showing a stiffener/stiffener bond and a stiffener/titanium bond according to an embodiment of the disclosure.

FIG. 15 is an illustration of a cross sectional view of an exemplary stiffener of the corrugation-stiffened structure 800 showing a stiffener/stiffener bond 1506 and a stiffener/titanium bond at the bonded joint 1502 according to an embodiment of the disclosure. As mentioned above, the bonded joints 1502 block a substantially minimum number of the perforations/holes 812 of the perforated panel skin 802, while allowing airflow therethrough and around the corrugated stiffeners 804 to a low-pressure passive aft-facing vent as explained above in more detail in the context of discussion of FIG. 9. Accurate control of bond-line width 1504 enables substantially precise control of the perforations/holes 812 blocked by the adhesive 1402. In this manner, embodiments of the disclosure provide a stiffening of the perforated panel skin 802 while maintaining a substantially precise air transfer necessary for providing laminar flow. The corrugated stiffeners 804 are bonded to the perforated panel skin 802 with, for example but without limitation, a 250F-cure film adhesive in an oven. Alternatively, the corrugated stiffeners 804 may be bonded to the perforated panel skin 802 by methods, such as but without limitation, thermal or ultra-sonic joining (i.e., for thermoplastic stiffeners), and the like. The bonded joint 1502 can be inspected by an inspection method, such as but without limitation, ultrasonic, optical, thermographic non-destructive inspection, and the like. The bond-line width 1504 of the bonded joint 1502 may be, for example but without limitation, about 0.14 to about 0.16 inches, and the like.

FIGS. 16-19 may have functions, material, and structures that are similar to the embodiments shown in FIGS. 1-15. Therefore common features, functions, and elements may not be redundantly described here.

FIG. 16 is an illustration of a perspective view of an exemplary corrugation-stiffened structure 1600 showing the corrugated leading edge strap 1604 according to an embodiment of the disclosure. The corrugation-stiffened structure 1600 comprises a leading edge tip 1602, the corrugated leading edge strap 1604, one or more upper corrugated stiffeners 1606 coupled to the inner surface 1612, one or more lower corrugated stiffeners 1608 coupled to the inner surface 1612, and one or more ends 1610.

As shown in FIG. 16, the corrugated leading edge strap 1604 couples the upper and lower corrugated stiffeners 1606/1608 (similar to the upper piece 822 and the lower piece 824 of corrugated stiffeners 804 in FIG. 8) to each other. In the embodiment shown in FIG. 16, the corrugated leading edge strap 1604 is configured to be detached from an area of the inner surface 1612 of the corrugation-stiffened structure 1600 near the leading edge tip 1602.

Figure 17:
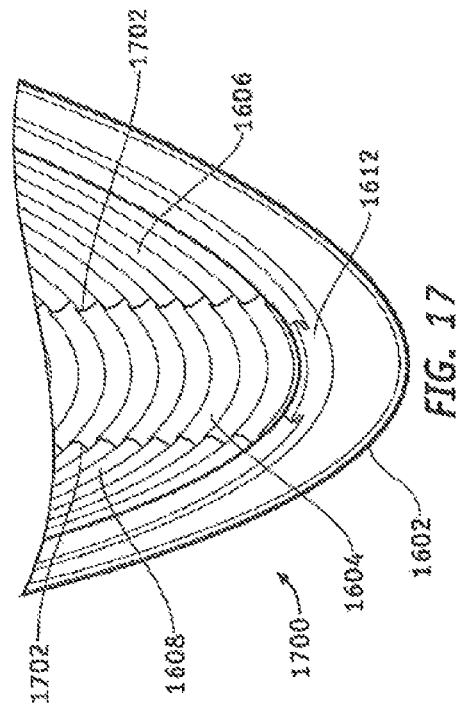
FIG. 17 is an illustration of an enlarged view of a portion of the exemplary laminar flow corrugation-stiffened bonded structure shown in FIG. 16 according to an embodiment of the disclosure.

FIG. 17 is an illustration of an enlarged view 1700 of a portion of the exemplary corrugation-stiffened structure 1600 showing the upper and lower corrugated stiffeners 1606/1608 coupled to each other by a corrugated leading edge strap 1604 bonded at front ends 1702 of the upper and lower corrugated stiffeners 1606/1608 according to an embodiment of the disclosure.

Figure 18:
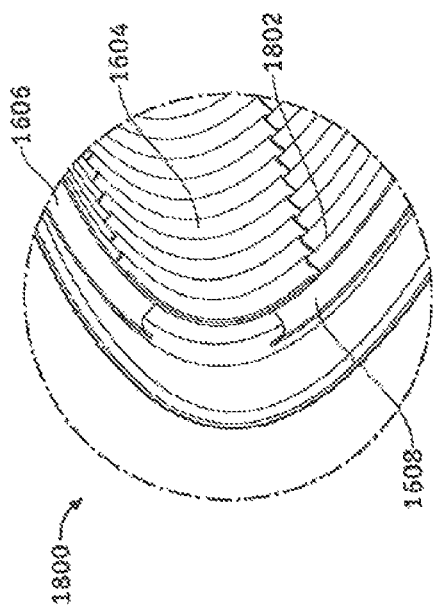
FIG. 18 is an illustration of an enlarged view of a portion of the exemplary laminar flow corrugation-stiffened bonded structure shown in FIG. 16 according to an embodiment of the disclosure.

FIG. 18 is an illustration of an enlarged view of a portion 1800 of the exemplary corrugation-stiffened structure 1600 according to an embodiment of the disclosure. As shown in FIG. 18 the corrugated leading edge strap 1604 conforms to ridges 1802 of the upper and lower corrugated stiffeners 1606/1608 but still allows air flow 906 (FIG. 9).

Figure 19:
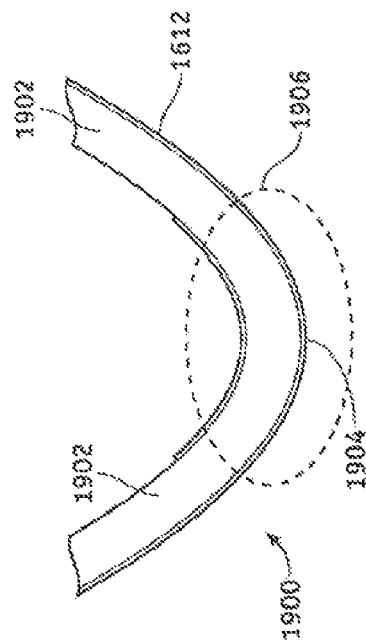
FIG. 19 is an illustration of a cross section of a portion of an exemplary laminar flow corrugation-stiffened bonded structure according to an embodiment of the disclosure.

FIG. 19 is an illustration of an enlarged view of a portion of an exemplary one-piece corrugation-stiffened structure 1900 showing the corrugated stiffeners 1902 bonded to the inner surface 1612 at a bonding area 1904 at the leading edge 1906 according to an embodiment of the disclosure. The corrugated stiffeners 1902 are one-piece and continuous around the leading edge 1906 (1602 in FIG. 16). Since the corrugated stiffeners 1902 are one-piece and continuous around the leading edge 308/814, a strap such as the corrugated leading edge strap 1604 is not used. In this manner, the perforations/holes 812 (FIG. 8) may be cut/drilled into the corrugated stiffeners 1902 around the leading edge 1906 (e.g., if the openings of the ends 810/1610 are not sufficient).

Figure 20:
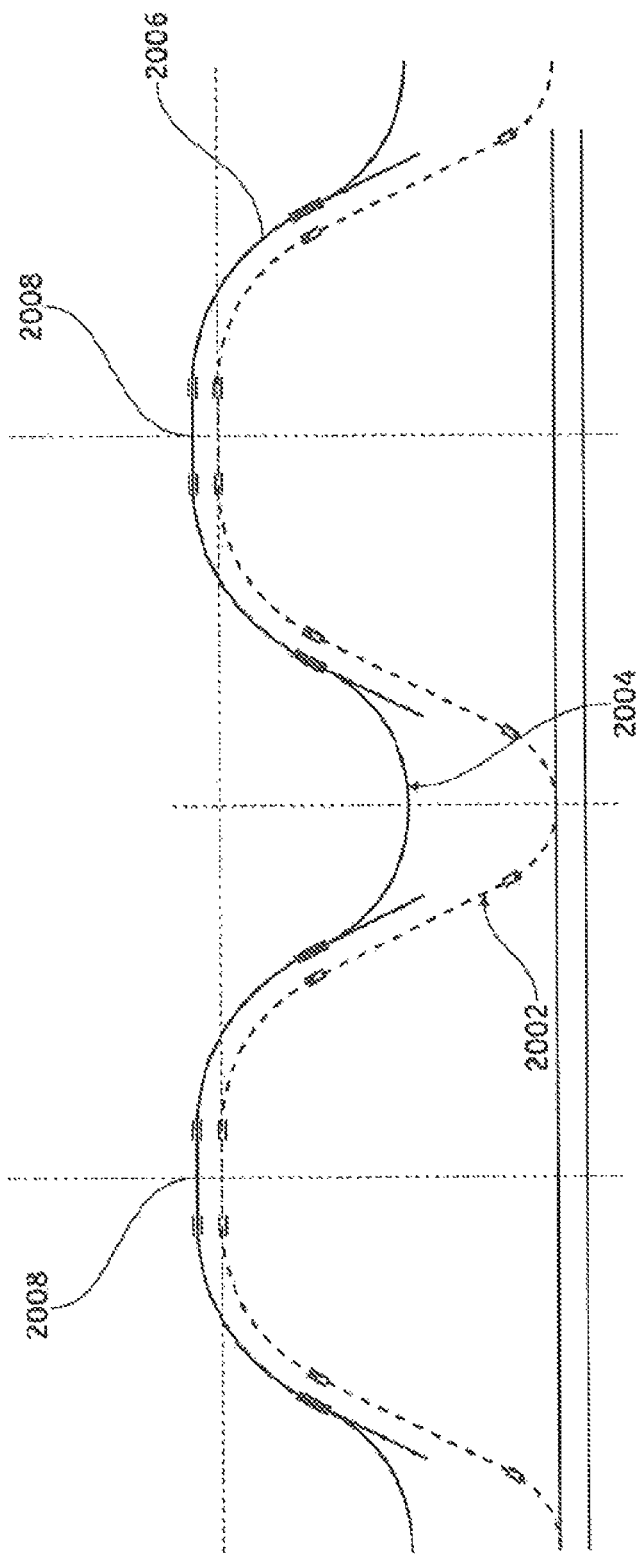
FIG. 20 is an illustration of a cross section of stiffeners and a strap of an exemplary laminar flow corrugation-stiffened bonded structure according to an embodiment of the disclosure.

FIG. 20 is an illustration of a cross section 2000 of corrugated stiffeners 2002 and a corrugated strap 2004 of an exemplary corrugation-stiffened structure 1600 according to an embodiment of the disclosure. As shown in FIG. 20, the corrugated strap 2004 couples the corrugated stiffeners 2002 to each other. The corrugated strap 2004 conforms to the inner surface 1612 (FIG. 16) and comprises ridges 2008 located, for example but without limitation, about 1.0 inch to about 1.2 inches apart.

Figure 21:
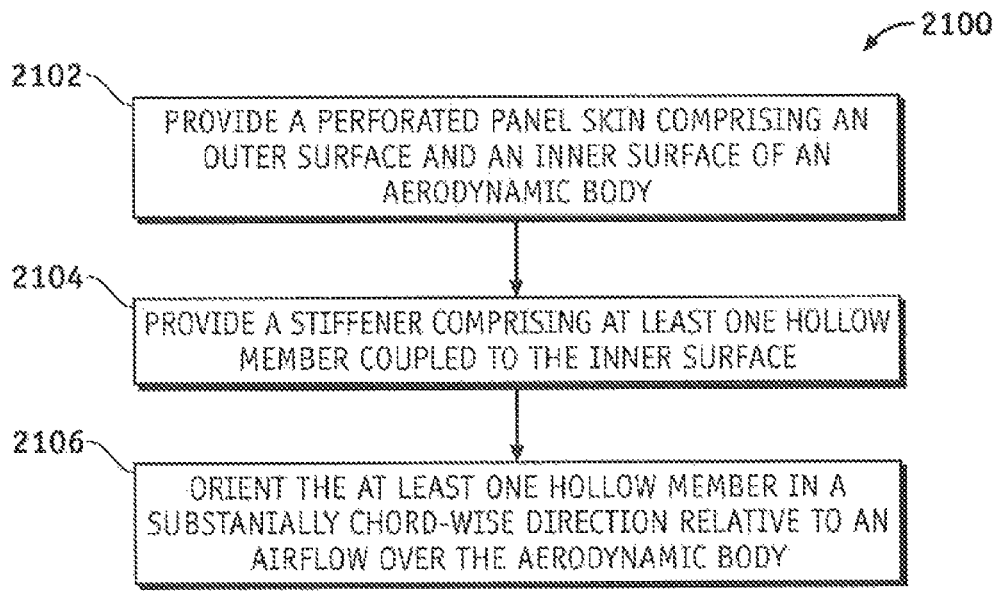
FIG. 21 is an illustration of an exemplary flow chart showing a process for providing a laminar flow corrugation-stiffened bonded structure according to an embodiment of the disclosure.

FIG. 21 is an illustration of an exemplary flow chart showing a process 2100 for providing a corrugation-stiffened structure 800/1600 for providing a laminar flow on a leading edge of an airfoil according to an embodiment of the disclosure. The various tasks performed in connection with process 2100 may be performed mechanically, by software, hardware, firmware, or any combination thereof. For illustrative purposes, the following description of process 2100 may refer to elements mentioned above in connection with FIGS. 1-20. In practical embodiments, portions of the process 2100 may be performed by different elements of the corrugation-stiffened structure 800 such as the perforated panel skin 802, the corrugated stiffeners 804, the strap 806, the edgeband 808, and the ends 810 of the corrugated stiffeners 804. Processes 2100 may have functions, material, and structures that are similar to the embodiments shown in FIGS. 1-20. Therefore common features, functions, and elements may not be redundantly described here.

Process 2100 may begin by providing a perforated panel skin such as the perforated panel skin 802 comprising the outer surface 908 and the inner surface 910 of an aerodynamic body such as the airfoil 400 (task 2102).

Process 2100 may then continue by providing the corrugated stiffener 804 comprising the at least one hollow member 818 coupled to the inner surface 910 (task 2104).

Process 2100 may then continue by orienting the at least one hollow member 818 in the substantially chord-wise direction 306 relative to the downstream airflow 310 over the aerodynamic body (task 2106).

Figure 22:
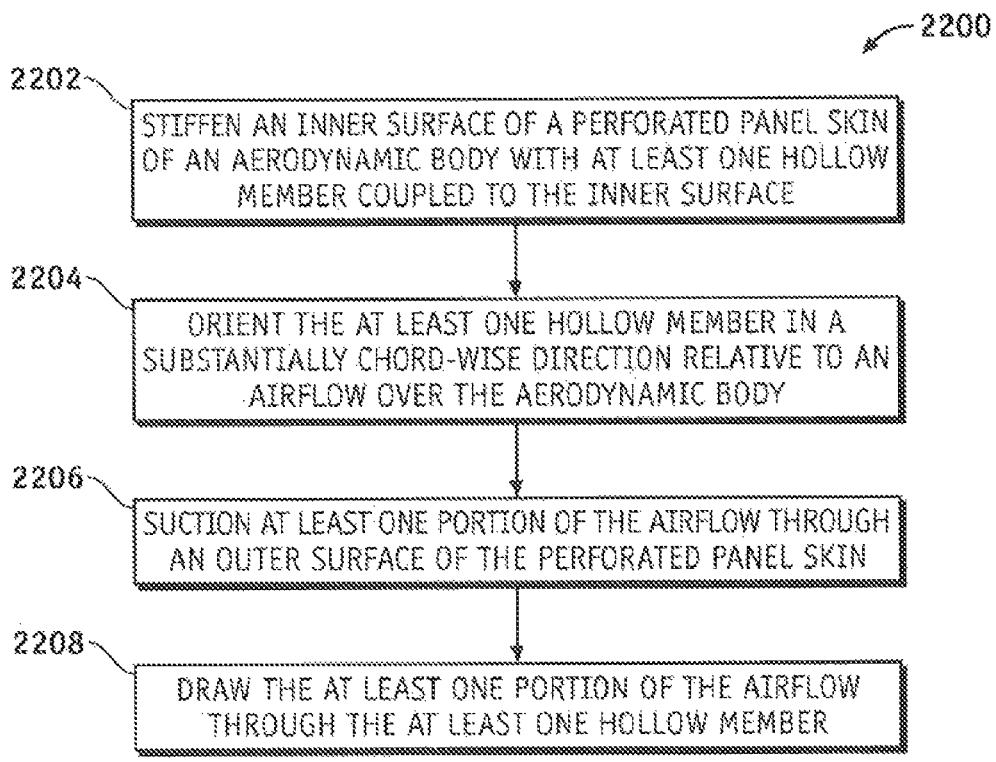
FIG. 22 is an illustration of an exemplary flow chart showing a process for providing a laminar flow on an aerodynamic body according to an embodiment of the disclosure.

FIG. 22 is an illustration of an exemplary flow chart showing a process 2200 for providing a corrugation-stiffened structure 800/1600 and for providing a laminar flow on a leading edge of an airfoil according to an embodiment of the disclosure. The various tasks performed in connection with process 2200 may be performed mechanically, by software, hardware, firmware, or any combination thereof.

For illustrative purposes, the following description of process 2200 may refer to elements mentioned above in connection with FIGS. 1-20. In practical embodiments, portions of the process 2200 may be performed by different elements of the corrugation-stiffened structure 800/1600 such as the perforated panel skin 802, the corrugated stiffeners 804, the strap 806, the edgeband 808, and the ends 810 of the corrugated stiffeners 804. Process 2200 may have functions, material, and structures that are similar to the embodiments shown in FIGS. 1-20. Therefore common features, functions, and elements may not be redundantly described here.

Process 2200 may begin by stiffening the inner surface 910 of the perforated panel skin 802 of the corrugation-stiffened structure 800 (aerodynamic body) with the at least one hollow member 818 coupled to the inner surface 910 (task 2202).

Process 2200 may then continue by orienting the at least one hollow member 818 in the substantially chord-wise direction 306 relative to an airflow such as the downstream airflow 310 over the aerodynamic body (task 2204).

Process 2200 may then continue by suctioning at least one portion of the downstream airflow 310 through the outer surface 908 of the perforated panel skin 802 of the aerodynamic body (task 2206).

Process 2200 may then continue by drawing the at least one portion of the downstream airflow 310 through the at least one hollow member 818 (task 2208).

In this way, various embodiments of the disclosure provide a method for stiffening of a skin of an aerodynamic body while maintaining a substantially precise air transfer necessary to maintain laminar boundary layer over the aerodynamic body. The embodiments allow airflow through a leading edge structure, which allows for laminar flow on the surface thereof, while still maintaining the required aerodynamic shape also necessary for the laminar flow. Maintaining the laminar flow, results in a large aerodynamic drag reduction as compared to tradition turbulent flow found on most commercial aircraft in service today. In addition, corrugation-stiffened structure 800, allows easy inspection of surfaces, may not substantially entrap moisture, is repairable via a bonded corrugated doubler easy to inspect and can be made in a variety of materials and material combination and could be used to replace honeycomb sandwich in many non-laminar-flow applications.

It may be possible to stiffen the aerodynamic bodies using stiffening structures other than corrugated stiffeners that may support the panel skin in the perforated area while allowing airflow to reduce turbulence and create laminar flow. FIG. 23 is an illustration of a perspective view of an exemplary laminar flow micro-lattice-stiffened structure 2300 according to an embodiment of the disclosure. As with the corrugation-stiffened structure 800, the micro-lattice-stiffened structure 2300 may be an aerodynamic body comprising, for example but without limitation, a flat panel, a curved leading edge, and the like. The micro-lattice-stiffened structure 2300 may have a similar configuration to the corrugation-stiffener structure 800, may include a similar perforated outer panel skin 2302 extending around an interior surface of the aerodynamic body, and may have an inner surface 2304 and an outer surface 2306 defining a leading edge 2308 of the aerodynamic body.

The outer panel skin 2302 may allow for passively suctioning air from the outer surface 2306 to the inner surface 2304 of the micro-lattice-stiffened structure 2300 via a plurality of perforations/holes 2310 extending from the inner surface 2304 to the outer surface 2306 to facilitate laminar flow over external aerodynamic bodies such as, but without limitation, the wings 502, the vertical fin 504, the horizontal stabilizers 506, the engine nacelle 508, the leading edge control surfaces 510, and the like as shown in FIGS. 5-7. The outer panel skin 2302 may be made of, for example but without limitation, CFRP, CP2 titanium, and the like. A thickness of the outer panel skin 2302 may be, for example but without limitation, about 0.04 inches to about 0.063 inches as may be necessary to achieve a desired performance of the aerodynamic body. The perforations 2310 of the outer panel skin 2302 may be suitably spaced, shaped, formed, and the like in the outer panel skin 2302 to facilitate laminar flow in a similar manner as described above for the perforations 812 of the perforated panel skin 802.

A micro-lattice stiffener structure 2312 may be formed to conform to the shape of the outer panel skin 2302 and to stiffen the micro-lattice-stiffened structure 2300. The micro-lattice stiffener structure 2312 may extend in the chord-wise direction 306 from the leading edge 2308 along the inner surface 2304 of the outer panel skin 2302 and terminate at a position downstream of the perforations 2310 through the outer panel skin 2302. The micro-lattice stiffener structure 2312 may be formed from a plurality of main beams 2314 interconnected by corresponding diagonal support struts 2316 and lateral support struts 2318 to form a lattice or truss structure. The main beams 2314 may have first ends 2314$a$ (side view of FIG. 24) connected to the inner surface 2304 of the outer panel skin 2302, and second ends 2314$b$ to which lateral support struts 2318 may be connected between the main beams 2314 in the embodiment shown in FIG. 24. The first ends 2314$a$ of the main beams 2314 may be bonded to the inner surface 2304 of the outer panel skin 2302 by appropriate bonding methods such as, but without limitation, thermal or ultra-sonic joining (i.e, thermoplastic stiffeners), adhesives, and the like. Depending on the fabrication method, the lateral support struts 2318 may be added after the main beams 2314 and diagonal support struts 2316 are formed together, such as during a photopolymer development process as described below, or may be formed along with the main beams 2314 and diagonal support struts 2316 as unitary components in a micro-lattice stiffener structure 2312 formed by other processes such as three-dimensional (3D) printing. In other embodiments, the lateral support struts 2318 may be omitted where the main beams 2314 and the diagonal support struts 2316 provide sufficient support for the outer panel skin 2302.

As further shown, each diagonal support strut 2316 may extend between the first end 2314$a$ of one of the main beams 2314 and the second end 2314$b$ of an adjacent one of the main beams 2314. The first ends 2314$a$ of the main beams 2314 may be bonded to the inner surface 2304 with an adhesive or other appropriate bonding compound or process to secure the micro-lattice stiffener structure 2312 in place. Each pair of adjacent main beams 2314 may have a pair of diagonal support struts 2316 extending there between so that the first end 2314$a$ of each adjacent main beam 2314 is connected to the second end 2314$b$ of the other adjacent main beam 2314. The diagonal support struts 2316 connected to adjacent main beams 2314 may intersect at a node 2320 to prevent relative movement between the diagonal support struts 2316 and to create stability in the micro-lattice stiffener structure 2312 along with the lateral support struts 2318. Those skilled in the art will understand that the configuration of the main beams 2314, the diagonal support struts 2316 and the lateral support struts 2318 is exemplary. Micro-lattice stiffener structures 2312 may be tailored based on the number of main beams 2314, sizes of the main beams 2314 and the support struts 2316, 2318, the directions of the components of the micro-lattice stiffener structures 2312 and the like to provide the necessary support for the outer panel skin 2302 and air flow through the micro-lattice-stiffened structures 2300, and such modifications of the micro-lattice stiffener structure 2312 are contemplated by the inventors.

FIG. 24 illustrates the micro-lattice stiffener structure 2312 being formed with a single layer of diagonal support struts 2316 interconnecting the main beams 2314 and having the lateral support struts 2318 providing support opposite the inner surface 2304 of the outer panel skin 2302. In alternate embodiments as discussed below, the micro-lattice stiffener structure 2312 may be provided with multiple layers of diagonal support struts 2316 as necessary to create the necessary structural support for the outer panel skin 2302. In such embodiments, the main beams 2314 may extend further into the interior of the aerodynamic body, and additional layers of diagonal support struts 2316 may be added in between the layer most proximate the inner surface 2304 of the outer panel skin 2302 and the first ends 2314$a$ of the main beams 2314, and the second ends 2314$b$ of the main beams 2314. Lateral support struts 2318 may be provided between the layers of diagonal support struts 2316 if necessary for structural support, or may only be provided at the second ends 2314$b$ of the main beams 2314, or not provided if not necessary for the structural integrity of the micro-lattice stiffener structure 2312. As will be apparent from the drawings, the arrangement of the main beams 2314, the diagonal support struts 2316 and the lateral support struts 2318 in the micro-lattice stiffener structure 2312 define airflow gaps 2322 there between to place the perforations 2310 of the outer panel skin 2302 in fluid communication with the interior surface of the aerodynamic body downstream from the micro-lattice stiffener structure 2312.

The micro-lattice stiffener structure 2312 may be fabricated using any appropriate know processes for forming open cell micro-lattice structures such as those illustrated and described herein. For example, the micro-lattice structure may be formed using a photopolymer development process where ultraviolet light beams are projected through a vat of liquid resin to cure the resin along the light beams into the main beams 2314, the diagonal support struts 2316 and, in particular embodiments, the lateral support struts 2318 of the micro-lattice stiffener structure 2312. The composite material forming the micro-lattice structure may be used if it provides sufficient structural support for the outer panel skin 2302. In other embodiments, the composite material structure may be coated with a metal such as a nickel alloy to convert the structure into a metallic micro-lattice structure. The composite material may be retained within the metal coating or, in some applications, the composite material may be dissolved or otherwise removed from within the metal coating by an appropriate process to leave a hollow metal micro-lattice structure with sufficient strength to support the outer panel skin 2302. Similar results may be achieved by eliminating the photopolymer process and using lost wax or industrial casting to form a hollow metal micro-lattice structure as described. As a further alternative, 3D printing may be used to produce a metal or polymer open cell structure forming the micro-lattice stiffener structure 2302. Use of 3D printing may provide the opportunity to vary the orientations, sizes and shapes of repeated structures used in forming the micro-lattice stiffener structure 2312. These fabrication methods are merely exemplary, and alternative fabrication methods will be apparent to those skilled in the art and are contemplated by the inventors as having use in forming micro-lattice stiffener structures 2312 in accordance with the present disclosure.

FIGS. 25 and 26 illustrate top views of alternative configurations of the micro-lattice stiffener structure 2312 with varying interconnections of the main beams 2314 and diagonal support struts 2316. Referring to FIG. 25, the main beams 2314 may be arranged on the inner surface 2304 of the outer panel skin 2302 in rows along land lines 2330 that are substantially parallel to the chord-wise direction 306 of the aerodynamic body. As used herein, a component may be substantially parallel or substantially perpendicular to another component or specified direction when the component is within 5° of the specified orientation. The land lines 2330 may coincide with the locations where the corrugated stiffeners 804 are connected to the inner surface 910 of the perforated panel skin 802 of FIGS. 8 and 9. In alternative embodiments, the land lines 2330 and, correspondingly, the main beams 2314 may be spaced as necessary for the micro-lattice stiffener structure 2312 to support the outer panel skin 2302.

In the embodiment of FIG. 25, the main beams 2314 are arranged in a two-dimensional array on the inner surface 2304 of the outer panel skin 2302. Each group of four adjacent main beams 2314 may define a quadrilateral 2332 with the main beams 2314 positioned at the corners. The quadrilateral 2332 is shown as approximating a square, but the actual shape may be any appropriate quadrilateral, such as a rectangle, a diamond, a rhombus, a rhomboid, a kite, a trapezoid or the like, as necessary to achieve the desired structural properties of the micro-lattice stiffener structure 2312. Two diagonal support struts 2316 may extend between the main beams 2314 at opposite corners of the quadrilateral 2332 and intersect at a node 2320 as discussed above. With this configuration, each node 2320 may have four intersecting diagonal support struts 2316 that extend through the quadrilateral 2332.

FIG. 26 shows an alternate configuration of the micro-lattice stiffener structure 2312 where the diagonal support struts 2316 interconnect the main beams 2314 in a different manner to achieve the desired structural properties for the micro-lattice stiffener structure 2312. The main beams 2314 may be arranged in a similar manner as discussed above in a two-dimensional array along the land lines 2330 and with each group of four adjacent main beams 2314 forming a quadrilateral 2340. In this embodiment, two diagonal support struts 2316 may extend between the main beams 2314 at adjacent corners of the quadrilateral 2340 and intersect at a node 2320 positioned along a side of the quadrilateral 2340. With this configuration, each node 2320 will have two intersecting diagonal support struts 2316 extending along a side of the quadrilateral 2340. Those skilled in the art will understand that additional configurations, combinations of the illustrated configurations, and interconnections of the main beams 2314 with diagonal support struts 2316 may be implemented in the micro-lattice stiffener structure 2312. For example, the main beams 2314 may be interconnected by the diagonal support struts 2316 to form a three-dimensional isogrid of tetrahedrons, or three sided pyramids, that can be formed by adjusting the orientation of the light source array in the photopolymer development process or by appropriately configuring a 3D printer. Such configurations are contemplated by the inventors as having use in micro-lattice stiffener structure 2312 in accordance with the present disclosure. For purposes of the following discussion, the configurations of FIGS. 25 and 26 and alternative configurations may be utilized.

Figure 27:
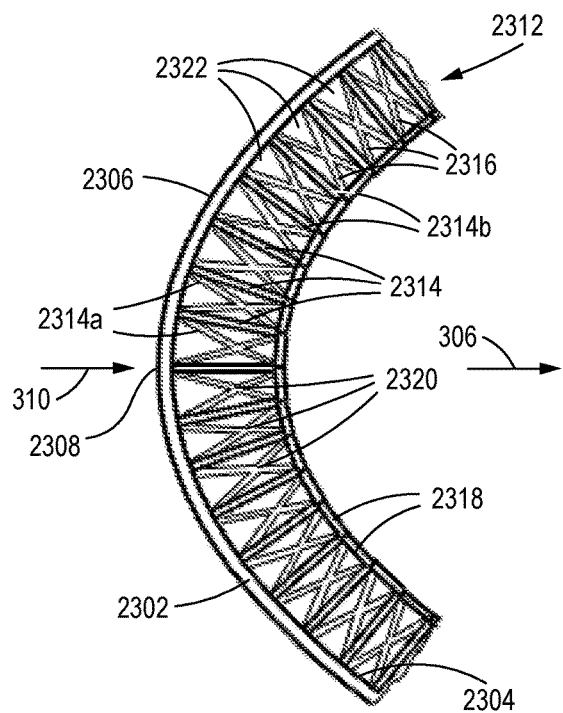
FIG. 27 is a partial side view of the micro-lattice-stiffened structure of FIG. 23 proximate a leading edge of the structure and with the micro-lattice stiffener structure having main beams approximately perpendicular to an inner surface of a perforated outer panel skin.

The configuration of the main beams 2314 and the diagonal support struts 2316 may be varied in other ways to achieve desired characteristics in the micro-lattice stiffener structure 2312. FIG. 27 provides an enlarged partial side view of the micro-lattice-stiffened structure 2300 of FIG. 23 showing the outer panel skin 2302 and the micro-lattice stiffener structure 2312 proximate the leading edge 2308. In the illustrated embodiment, each of the main beams 2314 may be oriented substantially perpendicular to a corresponding portion of the inner surface 2304 of the outer panel skin 2302 to which the main beam 2314 is connected. The first ends 2314a of the main beams 2314 may be spaced at approximately equal distances along the corresponding land lines 2330. The distance between the second ends 2314b of adjacent main beams 2314 may be less than the distance between the corresponding first ends 2314a as long as the inner surface 2304 of the outer panel skin 2302 has a degree of curvature and is not planar. The distance between adjacent second ends 2314b may be smallest for the main beams 2314 proximate the leading edge 2308, and may increase as the micro-lattice stiffener structure 2312 extends away from the leading edge 2308. The lengths of the lateral support struts 2318 may vary correspondingly.

Depending on the orientation of the aerodynamic body and its leading edge 2308 relative to the downstream airflow 310 and the chord-wise direction 306, the main beams 314 may not necessarily be perpendicular to the inner surface 2304 in three dimensions. For example, the wings 502, the vertical fin 504 and the horizontal stabilizers 506 in FIGS. 5-7 are angled rearward from the body of the aircraft 500 so that their leading edges are not perpendicular to the downstream airflow 310 and the chord-wise direction 306. For reference, a three-dimensional coordinate system is added to FIGS. 7 and 27 where an X-axis is parallel to the chord-wise direction 306 and the downstream airflow 310, the Y-axis extends from the body of the aircraft 500 in the direction of the corresponding aerodynamic body 502, 504, 506 and perpendicular to the X-axis, and the Z-axis is perpendicular to the X- and Y-axes. In FIG. 7, the leading edge of the wing 502 is not perpendicular to the chord-wise direction 306 (X-axis) when viewed in an X-Y plane as shown.

Within the aerodynamic bodies 502, 504, 506, the land lines 2330 described above may be parallel to the chord-wise direction 306 and the downstream airflow 310, but may not be perpendicular to the leading edge 2308 in an X-Y plane for the same reason. Because the land lines 2330 follow the curvature of the inner surface 2304 of the outer panel skin 2302, each land line 2330 will define an X-Z plane parallel to the chord-wise direction 306 as shown in FIG. 27. FIG. 27 may illustrate a view of the outer panel skin 2302 and the micro-lattice stiffener structure 2312 looking perpendicular to the X-Y planes defined by the land lines 2330 and at an acute angle with respect to the leading edge 2308 in an X-Y plane. The main beams 2314 may lie in the X-Z plane defined by the corresponding land line 2330, and therefore may be non-perpendicular with respect to the leading edge 2308 and corresponding portion of the inner surface 2304 in an X-Y plane. At the same time, the main beams 2314 may be perpendicular to the inner surface 2304 within the X-Z plane defined by the corresponding land line 2330 as seen in the view of FIG. 27.

Figure 28:
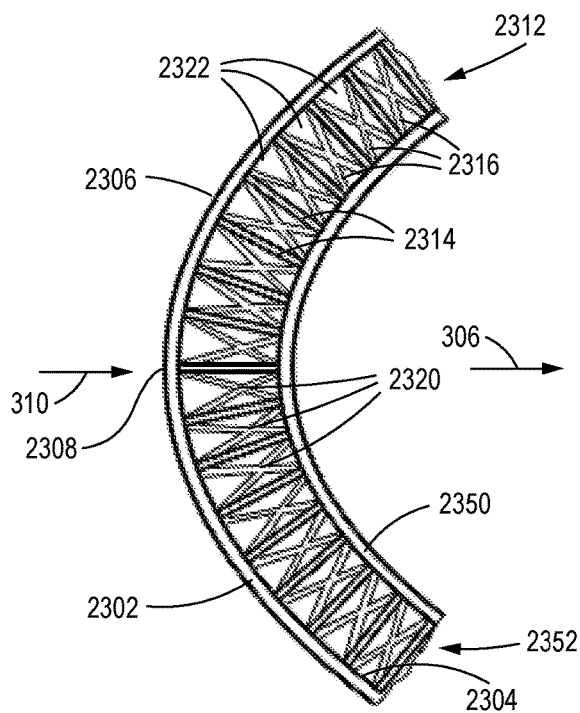
FIG. 28 is a partial side view of the micro-lattice-stiffened structure of FIG. 23 with the micro-lattice stiffener structure of FIG. 27 and an inner panel skin.

FIG. 28 illustrates an embodiment wherein the lateral support struts 2318 are replaced by an inner panel skin 2350. The inner panel skin 2350 may be disposed within the aerodynamic body proximate the leading edge 2308 and extend rearward. The inner panel skin 2350 conforms to the shape of the micro-lattice stiffener structure 2312 but still allows airflow. The inner panel skin 2350 may be connected to corresponding ones of the main beams 2314 at their second ends 2314*b*. The outer panel skin 2302 and the inner panel skin 2350 may define an airflow channel 2352 there between that places the perforations 2310 in fluid communication with the interior surface of the aerodynamic body downstream from the inner panel skin 2350. Similar to the corrugated stiffeners 804 discussed above, the airflow channel 2352 may function as a low-pressure passive aft-facing vent to allow a sufficient amount of air suction for maintaining a laminar boundary layer on the outer panel skin 2302. The inner panel skin 2350 may extend rearward for a portion of the micro-lattice stiffener structure 2312. In some embodiments, the inner panel skin 2350 may extend downstream of the perforations 2310 in the outer panel skin 2302, and may extend to the ends of the micro-lattice stiffener structure 2312 and be connected to the second ends 2314*b* of each of the main beams 2314 of the micro-lattice stiffener structure 2312. The inner panel skin 2350 may be made from the same or a different light weight material than the outer panel skin 2302. For example but without limitation, the inner panel skin 2350 may be fabricated from carbon fiber-reinforced polymer, CP1 or CP2 titanium, and the like. The inner panel skin 2350 is bonded to the micro-lattice stiffener structure 2312 at least in the area near the leading edge 2308 to provide further stiffness and strength to the micro-lattice-stiffened structure 2300. In alternate embodiments, the inner panel skin 2350 may have airflow openings (not shown) allowing flow-through flow of air in the micro-lattice stiffener structure 2312 to the plenum area without necessarily passing through airflow channel 2352. The airflow openings may be micro-perforations through the inner panel skin 2350, larger holes, slots or any other appropriate orifices providing a desired flow through the inner panel skin 2350 without compromising the support of the micro-lattice stiffener structure 2312 provided by the inner panel skin 2350.

Figure 29:
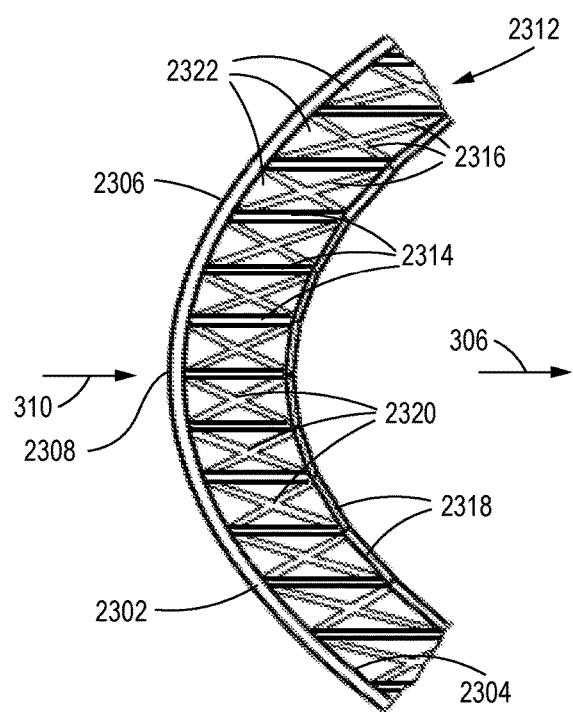
FIG. 29 is a partial side view of the micro-lattice-stiffened structure of FIG. 23 proximate the leading edge of the structure and with the micro-lattice stiffener structure having main beams approximately parallel to a downstream direction of the micro-lattice-stiffened structure.
Figure 30:
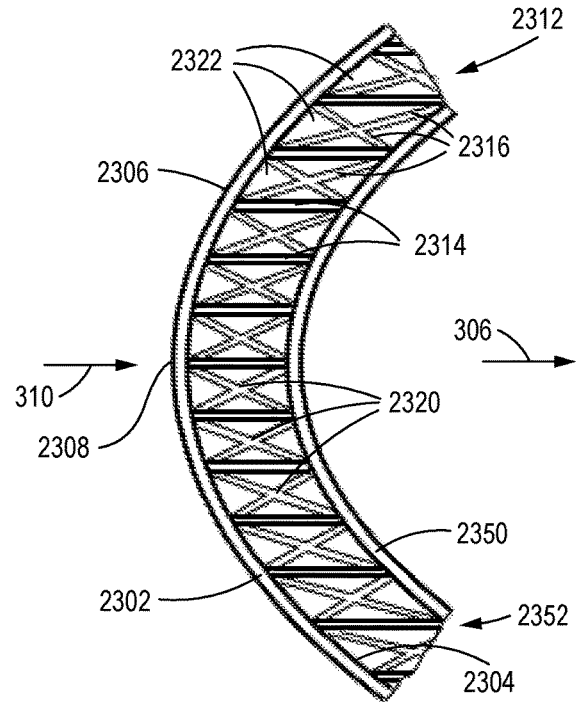
FIG. 30 is a partial side view of the micro-lattice-stiffened structure of FIG. 23 proximate the leading edge of the structure and with the micro-lattice stiffener structure of FIG. 29 and an inner panel skin.

Turning to FIG. 29, in a further alternative embodiment of the micro-lattice stiffener structure 2312, the plurality of main beams 2314 may be oriented substantially parallel to each other and substantially parallel to the chord-wise direction 306 of the aerodynamic body. This configuration of the micro-lattice stiffener structure 2312 may be simpler to design and manufacture than varying the orientations of the main beams 2314 to be perpendicular to the inner surface 2304 as in the embodiments of FIGS. 27 and 28. In the embodiment of FIG. 29, the micro-lattice stiffener structure 2312 is further reinforced by the lateral support struts 2318 connecting the second ends 2314*b* of the main beams 2314 as previously described. In the embodiment of FIG. 30, the lateral support struts 2318 are replaced by the inner panel skin 2350 that combines with the outer panel skin 2302 to define the airflow channel 2352 directing airflow from the perforations 2310 to the interior surface of the aerodynamic body.

Figure 31:
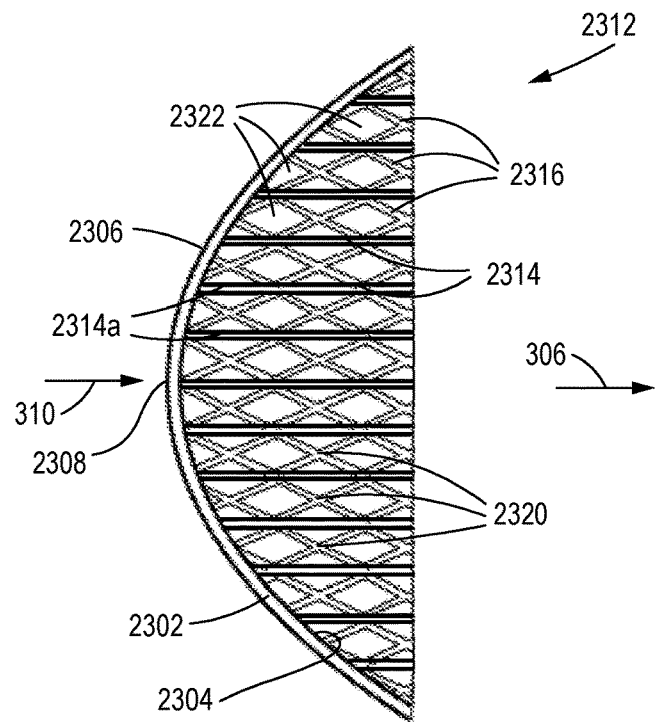
FIG. 31 is a partial side view of the micro-lattice-stiffened structure of FIG. 23 proximate the leading edge of the structure and with the micro-lattice stiffener structure having multiple layers and main beams approximately parallel to a downstream direction of the micro-lattice-stiffened structure.

FIG. 31 shows a modification of the embodiments of FIGS. 29 and 30 wherein the substantially parallel main beams 2314 are extended further in the chord-wise direction 306 into the aerodynamic body. To support the additional length of main beams 2314, the micro-lattice stiffener structure 2312 may include multiple layers of diagonal support struts 2316 interconnecting the main beams 2314 as the main beams 2314 extend downstream from the leading edge 2308 of the aerodynamic body. The second ends 2314*b* of the main beams 2314 may extend beyond the perforations 2310 in the outer panel skin 2302 so that the micro-lattice stiffener structure 2312 fully supports the perforated portion of the outer panel skin 2302.

Figure 32:
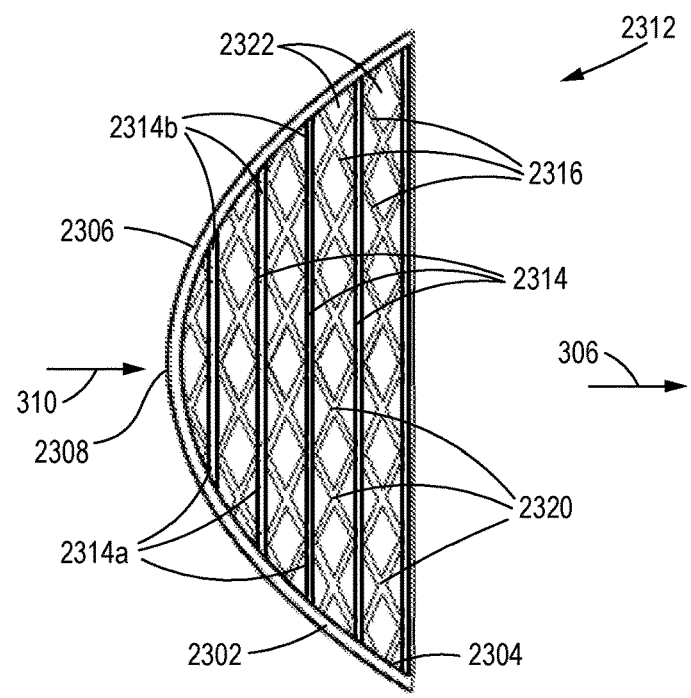
FIG. 32 is a partial side view of the micro-lattice-stiffened structure of FIG. 23 proximate the leading edge of the structure and with the micro-lattice stiffener structure having multiple layers and main beams approximately perpendicular to a downstream direction of the micro-lattice-stiffened structure.

FIG. 32 illustrates a further alternative embodiment of the micro-lattice stiffener structure 2312 wherein the plurality of main beams 2314 are oriented substantially perpendicular to the chord-wise direction 306 of the aerodynamic body. With this orientation, both the first ends 2314*a* and the second ends 2314*b* of the main beams 2314 may be connected to the inner surface 2304 of the outer panel skin 2302. As seen in the drawing figure, the main beams 2314 proximate the leading edge 2308 will be relatively short, and the lengths of the main beams 2314 will increase as the micro-lattice stiffener structure 2312 extends downstream from the leading edge 2308. Multiple layers of diagonal support struts 2316 may be provide between adjacent main beams 2314 as necessary as the lengths of the main beams vary to provide the necessary support to the outer panel skin 2302 in the area of the perforations.

Figure 33:
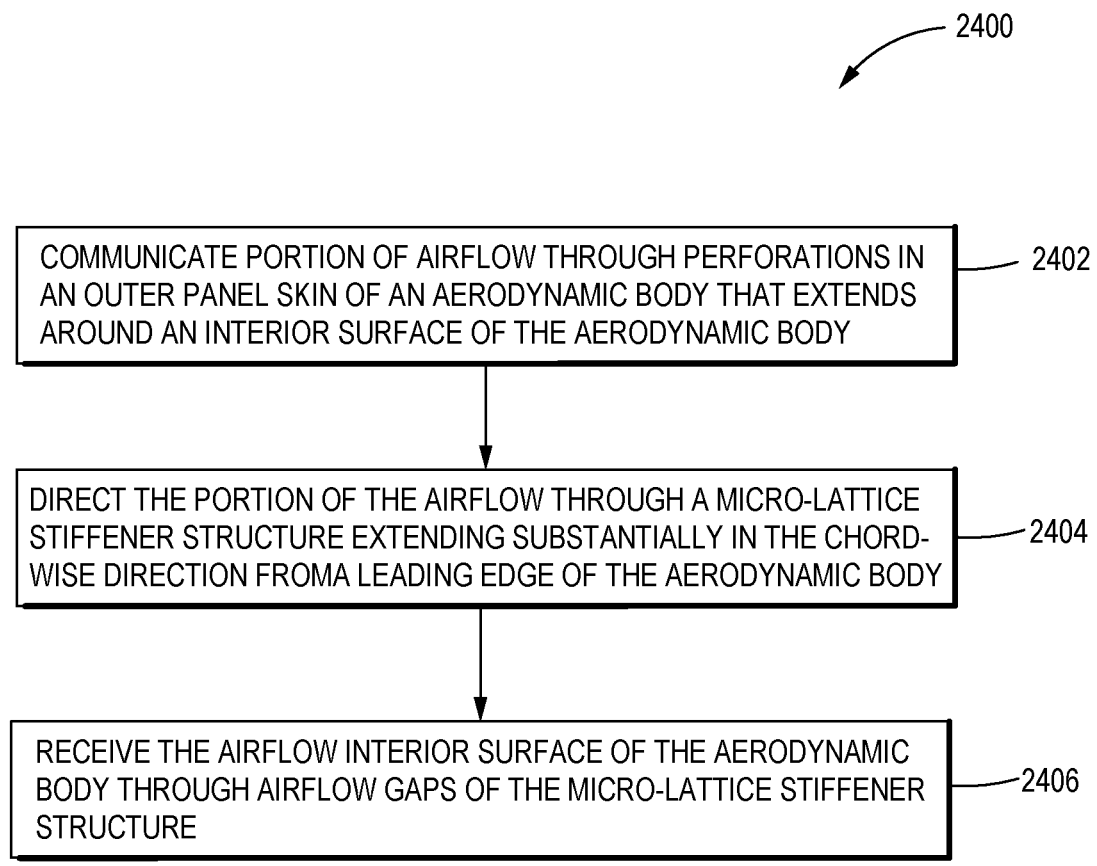
FIG. 33 is an illustration of an exemplary flow chart showing a process for providing a laminar flow micro-lattice-stiffened structure according to an embodiment of the disclosure.

FIG. 33 is an illustration of an exemplary flow chart showing a process 2400 for providing the micro-lattice-stiffened structure 2300 and for providing a laminar flow on the leading edge 2308 of an aerodynamic body according to embodiments of the disclosure shown in FIGS. 23-32. The various tasks performed in connection with process 2400 may be performed mechanically, by software, hardware, firmware, or any combination thereof. For illustrative purposes, the following description of process 2400 may refer to elements mentioned above in connection with FIGS. 2-7 and 23-32. In practical embodiments, portions of the process 2400 may be performed by different elements of the micro-lattice-stiffened structure 2300 such as the outer panel skin 2302, micro-lattice stiffener structure 2312 and the inner panel skin 2350. Process 2400 may have functions, material, and structures that are similar to the embodiments shown in FIGS. 23-32. Therefore common features, functions, and elements may not be redundantly described here.

The process 2400 may begin at a block 2402 by communicating a portion of the downstream airflow 310 through the perforations 2310 formed in the outer panel skin 2302 of the aerodynamic body, where the outer panel skin 2302 extends at least partially around an interior surface of the aerodynamic body. The process 2400 may continue at a block 2404 by directing the portion of the downstream airflow 310 from the perforations 2310 through the micro-lattice stiffener structure 2312 defining the airflow gaps 2322 there through and extending substantially in the chord-wise direction 306 from the leading edge 2308 of the aerodynamic body. The process 2400 may then continue at a block 2406 by receiving the downstream airflow 310 into the interior surface of the aerodynamic body through the airflow gaps 2322 of the micro-lattice stiffener structure 2312.

The various embodiments of the disclosure provide a structure and a method for stiffening of an outer panel skin 2302 of an aerodynamic body while maintaining a substantially precise air transfer necessary to maintain a laminar boundary layer over the aerodynamic body. The embodiments allow airflow through a leading edge structure, which allows for laminar flow on the surface thereof, while still maintaining the required aerodynamic shape also necessary for the laminar flow. Maintaining the laminar flow results in a large aerodynamic drag reduction as compared to tradition turbulent flow found on most commercial aircraft in service today. In addition, the micro-lattice-stiffened structure 2300 may block fewer of the perforations 2310 of the outer panel skin 2302 than the corrugated stiffeners 804 in other embodiments as less surface area will be required to bond the first ends 2314a of the main beams 2314 to the inner surface 2304 than for bonding the lines of the corrugated stiffeners 804. Moreover, the airflow through the airflow gaps 2322 in the micro-lattice stiffener structure 2312 may allow for a reduction in the number of perforations 2310 through the outer panel skin 2302, along with a corresponding reduction in the cost of the aerodynamic body. Additionally, fabrication methods for the micro-lattice stiffener structure 2312 may allow the shape of the structure 2312 to be tailored so that the first ends 2314a of the main beams 2314 avoid the perforations 2310 altogether to ensure that none of the perforations 2310 are blocked by the micro-lattice stiffener structure 2312.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 8-20 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. An aerodynamic body defining a chord-wise direction relative to an airflow over the aerodynamic body, comprising:

an outer panel skin having an inner surface, an outer surface, and a plurality of perforations extending from the inner surface to the outer surface, the outer panel skin extending around an interior of the aerodynamic body and defining a leading edge of the aerodynamic body; and a micro-lattice stiffener structure including:

a plurality of main beams each having at least a first end connected to the inner surface of the outer panel skin, and a plurality of diagonal support struts each extending diagonally between and connected to adjacent main beams, Wherein the micro-lattice stiffener structure extends along the inner surface of the outer panel skin downstream of the plurality of perforations, and the plurality of main beams and the plurality of diagonal support struts define airflow gaps there between; and an inner panel skin disposed within the aerodynamic body proximate the leading edge and extending rearward with the inner panel skin being connected to corresponding ones of the plurality of main beams at second ends that are opposite the first ends of the corresponding ones of the plurality of main beams, wherein the inner panel skin does not have perforations, and the outer panel skin and the inner panel skin define an airflow channel there between through which air entering the aerodynamic body through the plurality of perforations flows through the airflow channel in the chord-wise direction to the interior of the aerodynamic body downstream from the inner panel skin in the chord-wise direction.

2. The aerodynamic body of claim 1, in which the plurality of main beams are arranged on the inner surface of the outer panel skin in rows along land lines that are substantially parallel to the chord-wise direction.

3. The aerodynamic body of claim 1, in which the plurality of main beams are arranged in a two-dimensional array on the inner surface of the outer panel skin, wherein each group of four of the plurality of main beams defines corners of a quadrilateral and two of the plurality of diagonal support struts extend between the main beams at opposite corners of the quadrilateral, with the two of the plurality of diagonal support struts intersecting at a node within the quadrilateral.

4. The aerodynamic body of claim 1, in which the plurality of main beams are arranged in a two-dimensional array on the inner surface of the outer panel skin, wherein each group of four of the plurality of main beams defines corners of a quadrilateral and two of the plurality of diagonal support struts extend between the main beams at adjacent corners of the quadrilateral, with the two of the plurality of diagonal support struts intersecting at nodes along sides of the quadrilateral.

5. The aerodynamic body of claim 1, further comprising lateral support struts connected to adjacent ones of the plurality of main beams at second ends that are opposite the first ends of the plurality of main beams connected to the inner surface of the outer panel skin.

6. The aerodynamic body of claim 1, in which each of the plurality of main beams is substantially perpendicular to a corresponding portion of the inner surface of the outer panel skin to which the main beam is connected.

7. The aerodynamic body of claim 1, in which the plurality of main beams are substantially parallel to the chord-wise direction of the aerodynamic body.

8. The aerodynamic body of claim 7, further comprising multiple layers of diagonal support struts connected to the plurality of main beams as the plurality of main beams extends downstream from the leading edge of the aerodynamic body.

9. The aerodynamic body of claim 1, in which the plurality of main beams are substantially perpendicular to the chord-wise direction and second ends of the plurality of main beams are connected to the inner surface of the outer panel skin.

10. An aerodynamic body defining a chord-wise direction relative to an airflow over the aerodynamic body, comprising:
   an outer panel skin having an inner surface, an outer surface, and a plurality of perforations extending from the inner surface to the outer surface, the outer panel skin extending around an interior of the aerodynamic body and defining a leading edge of the aerodynamic body;
   a micro-lattice stiffener structure including:
      a plurality of main beams each having at least a first end connected to the inner surface of the outer panel skin, and
      a plurality of diagonal support struts each extending diagonally between and connected to adjacent main beams, Wherein the micro-lattice stiffener structure extends along the inner surface of the outer panel skin downstream of the plurality of perforations, and the plurality of main beams and the plurality of diagonal support struts define airflow gaps there between to place the plurality of perforations in fluid communication with the interior of the aerodynamic body downstream from the micro-lattice stiffener structure; and
   an inner panel skin disposed within the aerodynamic body proximate the leading edge and extending rearward with the inner panel skin being connected to corresponding ones of the plurality of main beams at second ends that are opposite the first ends of the corresponding ones of the plurality of main beams, wherein the outer panel skin and the inner panel skin define an airflow channel there between through which air entering the aerodynamic body through the plurality of perforations flows through the airflow channel in the chord-wise direction to the interior of the aerodynamic body downstream from the inner panel skin in the chord-wise direction without airflow penetrating the inner panel skin.

11. The aerodynamic body of claim 10, in which the inner panel skin extends downstream of the plurality of perforations.

12. The aerodynamic body of claim 11, in which the inner panel skin extends to ends of the micro-lattice stiffener structure and the inner panel skin is connected to the second ends of each of the plurality of main beams.

13. The aerodynamic body of claim 10, in which each of the plurality of main beams is substantially perpendicular to a corresponding portion of the inner surface of the outer panel skin to which the main beam is connected.

14. The aerodynamic body of claim 10, in which the plurality of main beams are substantially parallel to the chord-wise direction of the aerodynamic body.

15. The aerodynamic body of claim 10, further comprising a plenum chamber disposed in the interior of the aerodynamic body and in direct fluid communication with the airflow channel.

* * * * *